US012066148B1

(12) United States Patent
Tompkins et al.

(10) Patent No.: US 12,066,148 B1
(45) Date of Patent: Aug. 20, 2024

(54) ADJUSTABLE STRAP SYSTEM AND RELATED DEVICES AND METHODS

(71) Applicant: META PLATFORMS TECHNOLOGIES, LLC, Menlo Park, CA (US)

(72) Inventors: Glen Jason Tompkins, Woodinville, WA (US); Boyd Drew Allin, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 921 days.

(21) Appl. No.: 17/088,616

(22) Filed: Nov. 4, 2020

Related U.S. Application Data

(60) Provisional application No. 63/031,558, filed on May 28, 2020.

(51) Int. Cl.
| | |
|---|---|
| *A42B 3/14* | (2006.01) |
| *A44C 5/00* | (2006.01) |
| *F16D 51/46* | (2006.01) |
| *F16M 13/04* | (2006.01) |
| *G02B 27/01* | (2006.01) |

(52) U.S. Cl.
CPC ........... *F16M 13/04* (2013.01); *A44C 5/0053* (2013.01); *F16D 51/46* (2013.01); *G02B 27/0176* (2013.01); *G02B 2027/0178* (2013.01)

(58) Field of Classification Search
CPC ....... F16D 51/46; A42B 3/145; A44B 11/125; Y10T 24/2187
See application file for complete search history.

(56) References Cited

U.S. PATENT DOCUMENTS

| | | | |
|---|---|---|---|
| 2019/0037715 A1 | 1/2019 | Chen et al. | |
| 2019/0293945 A1* | 9/2019 | Chang | ................ G02B 27/0176 |
| 2020/0121017 A1* | 4/2020 | King | ........................ A42B 3/14 |
| 2022/0404627 A1* | 12/2022 | Weiss | ................. G02B 27/0176 |
| 2023/0250863 A1* | 8/2023 | Lee | ........................ F16H 19/08 |
| | | | 74/89.18 |

* cited by examiner

*Primary Examiner* — Robert Sandy
*Assistant Examiner* — Michael S Lee
(74) *Attorney, Agent, or Firm* — Greenberg Traurig, LLP

(57) ABSTRACT

The disclosed strap adjustment device may include a pinion gear secured to an adjustment knob, a first rack secured to a first strap and engaged with the pinion gear, a second rack secured to a second strap and engaged with the pinion gear, a braking element disposed adjacent to an inner surface of a drum, a brake engagement element configured to press the at least one braking element toward the inner surface of the drum to maintain a length of the first strap and the second strap by engagement of the braking element against the inner surface of the drum, and a spiral spring configured to allow for an increase in a length of the first strap and the second strap when a tension force is applied to at least one of the first strap or the second strap.

19 Claims, 14 Drawing Sheets

700

Engage a first rack extending from a first strap with a pinion gear
710

Engage a second rack extending from a second strap with the pinion gear
720

Dispose at least one braking element adjacent to an inner surface of a drum
730

Position a brake engagement element to press the at least one braking element toward the inner surface of the drum to maintain a length setting of the first strap and the second strap
740

Couple at least one spring configured to allow for an increase in a length of at least one of the first strap or the second strap when a tension force is applied to at least one of the first strap or the second strap
750

FIG. 7

ADJUSTABLE STRAP SYSTEM AND RELATED DEVICES AND METHODS

CROSS REFERENCE TO RELATED APPLICATION

This application claims the benefit of U.S. Provisional Application No. 63/031,558, filed on May 28, 2020, the disclosure of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 7 is a flow diagram illustrating an example method of manufacturing an adjustable strap system, according to at least one embodiment of the present disclosure.

Figure 1:
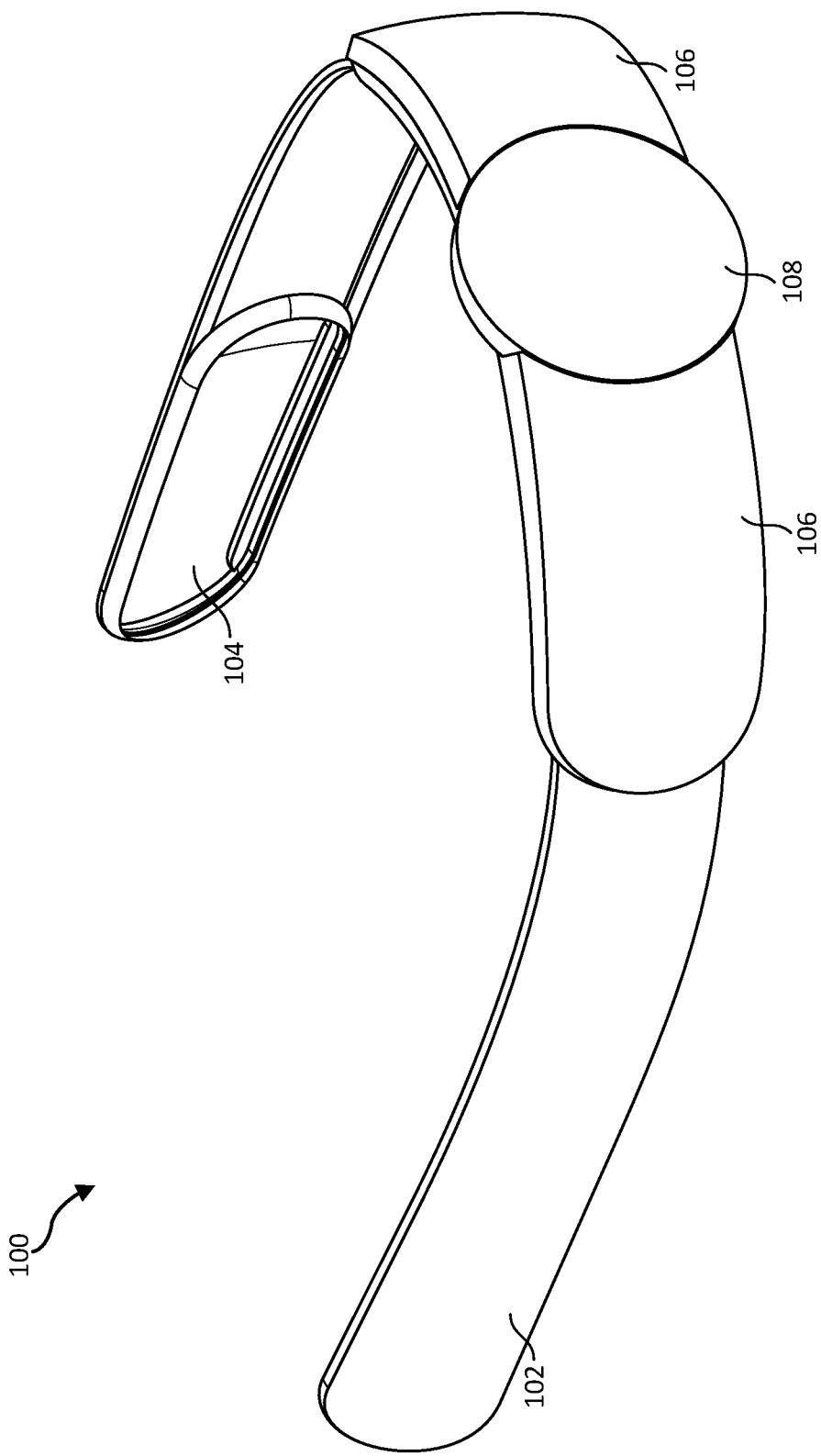
FIG. 1 is a perspective view of an example adjustable strap system, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

A traditional adjustable strap system (e.g., an adjustable band) for a head-worn device (e.g., a head-mounted display) may include an adjustment knob that, when rotated in one direction, increases the tension on the strap and allows the user to set the proper tension. Decreasing the tension in order to doff (remove) the head-worn device may require rotating the knob in an opposite direction. This may result in losing a tension setting created by the user. A traditional adjustable strap system may include adjustment mechanisms that utilize a ratchet design in which rotation of the adjustment knob increases or decreases the tension and/or lengths of the straps.

A traditional adjustable strap with a ratchet design may include a pawl that engages a radial tooth array to set the adjusted tension and/or lengths of the straps. The pawl may be biased to mesh into the tooth array producing an undesirable audible clicking sound as the pawl rides over each tooth. The audible sound may be reduced with decreasing tooth size; however, this also reduces the pawl engagement with the tooth array and decreases the holding forces of the mechanism. Additional pawls may be incorporated to restore the original holding force of the mechanism, adding complexity of timing the pawls to simultaneously engage and disengage the static tooth array.

Some traditional adjustable strap systems may include a direct drive design that holds a static position once the desired tension and/or strap length set point is achieved. For an adjustable strap system on a head-mounted display (HMD), this set point may provide the necessary strap tension to pull the HMD into a user's face, compressing the facial foam on the HMD to hold the HMD in place. However, to remove the HMD, the user must either loosen the adjustment by rotating the adjustment knob, thereby losing the set point position, or maintain the set point and slide the HMD over the user's forehead. Sliding the HMD over the user's forehead without releasing the tension on the straps may cause discomfort to the user. Some embodiments of the present disclosure may provide advantages over a traditional adjustable strap system including, without limitation, eliminating the clicking noise associated with a pawl snapping into place as it rides over each tooth of a tooth array and providing a smooth, comfortable, and quiet operation.

Some embodiments of the present disclosure may provide further advantages over traditional adjustable strap systems, such as allowing the adjustable strap to provide additional strap length travel while maintaining the desired adjustment set point (e.g., a comfortable set point set by the user). This is in contrast to many traditional adjustable strap systems that maintain a rigid connection between the adjustment mechanism and the component being tensioned (e.g., the HMD straps).

Embodiments of the present disclosure allow the user to rotate an adjustment knob to set the proper tension for the user when donning the head-worn device but may also provide additional travel length for the straps to extend without rotating the knob in the opposite direction when doffing or making minor fit adjustments to the head-worn device. Embodiments of the present disclosure allow the user to retain the knob position and tension setting but also allow the user to comfortably remove the head-worn device based on the additional strap travel length. Once the desired strap tension is reached, the adjustable strap system may maintain this set point adjustment. A strap lengthening mechanism (e.g., springs) may then be utilized to provide additional strap travel by pulling outwards on the HMD, creating clearance for comfortable removal, while still maintaining the initial tension and/or length setting.

The following will provide, with reference to FIGS. 1-12, detailed descriptions of an adjustable strap system including related devices and methods. A description of an adjustable strap system and a method of setting strap tension and/or strap length is presented in reference to FIGS. 1 and 2. A description of a braking mechanism for an adjustable strap system is presented in reference to FIGS. 3A-6. FIG. 7 illustrates a method of manufacturing an adjustable strap system. FIGS. 8-12 illustrate various types of example artificial-reality devices that may be used with an adjustable strap system.

FIG. 1 illustrates a perspective view of an example adjustable strap system 100. Adjustable strap system 100 may be an adjustable strap system for a head-worn device (e.g., an HMD) that allows a user (e.g., a wearer of the HMD) to rotate an adjustment knob 108 to set a proper tension and/or length for the user when donning the head-worn device. For example, the user may rotate adjustment knob 108 in an engaging direction (e.g., a clockwise direction when viewed from the rear of adjustable strap system 100 as shown in FIG. 1) that decreases a length of left strap 102 and/or right strap 104. The distal ends of left strap 102 and right strap 104 may be secured to a head-worn device, such as virtual-reality system 900 of FIG. 9 and/or head-mounted display 1102 of FIG. 11.

As adjustment knob 108 is rotated in the engaging direction and the lengths of left strap 102 and/or right strap 104 are decreasing, the head-worn device may tighten (e.g., increase tension in) left strap 102 and right strap 104 to increase a force of the head-worn device against the user's face. The user may don the head-worn device and rotate adjustment knob 108 until a comfortable tension setting is reached. Additionally or alternatively, the user may desire to decrease the tension (e.g., loosen) of the head-worn device by rotating adjustment knob 108 in a disengaging direction (e.g., a counter-clockwise direction when viewed from the rear of adjustable strap system 100 as shown in FIG. 1). Rotating adjustment knob 108 in a disengaging direction may increase the lengths of left strap 102 and/or right strap 104 thereby decreasing the tension of the head-worn device against the user's face. As will be described in detail below with reference to FIG. 2, rotating adjustment knob 108 may cause a length adjustment mechanism (e.g., a rack and pinion mechanism) underneath covers 106 to increase and/or decrease the lengths of left strap 102 and/or right strap 104.

In some examples, adjustable strap system 100 may include a power source. The power source may include, without limitation, capacitors, solar converters, lithium ion batteries, lithium-polymer batteries, primary lithium batteries, alkaline batteries, or any other form of power storage. The power source may be charged via a wired and/or wireless connection to an external power source. The power source may be located anywhere within adjustable strap system 100. For example, the power source may be located under covers 106.

In some examples, adjustable strap system 100 may allow a user to rotate adjustment knob 108 until a comfortable tension setting is reached and provide additional travel length in left strap 102 and/or right strap 104 to allow a user to doff (e.g., remove) the head-worn device by pulling the device away from the user's face and lifting the device off the user's head without rotating adjustment knob 108 in the disengaging direction. As will be described in detail below with reference to FIGS. 2-6, adjustable strap system 100 may include at least one braking element that holds the tension set by the user and a lengthening mechanism (e.g., one or more spiral springs) that increases the length of left strap 102 and/or right strap 104 when the user is removing the head-worn device. Adjustable strap system 100 may allow the initial tension set by the user to be maintained throughout the removal process.

Figure 2:
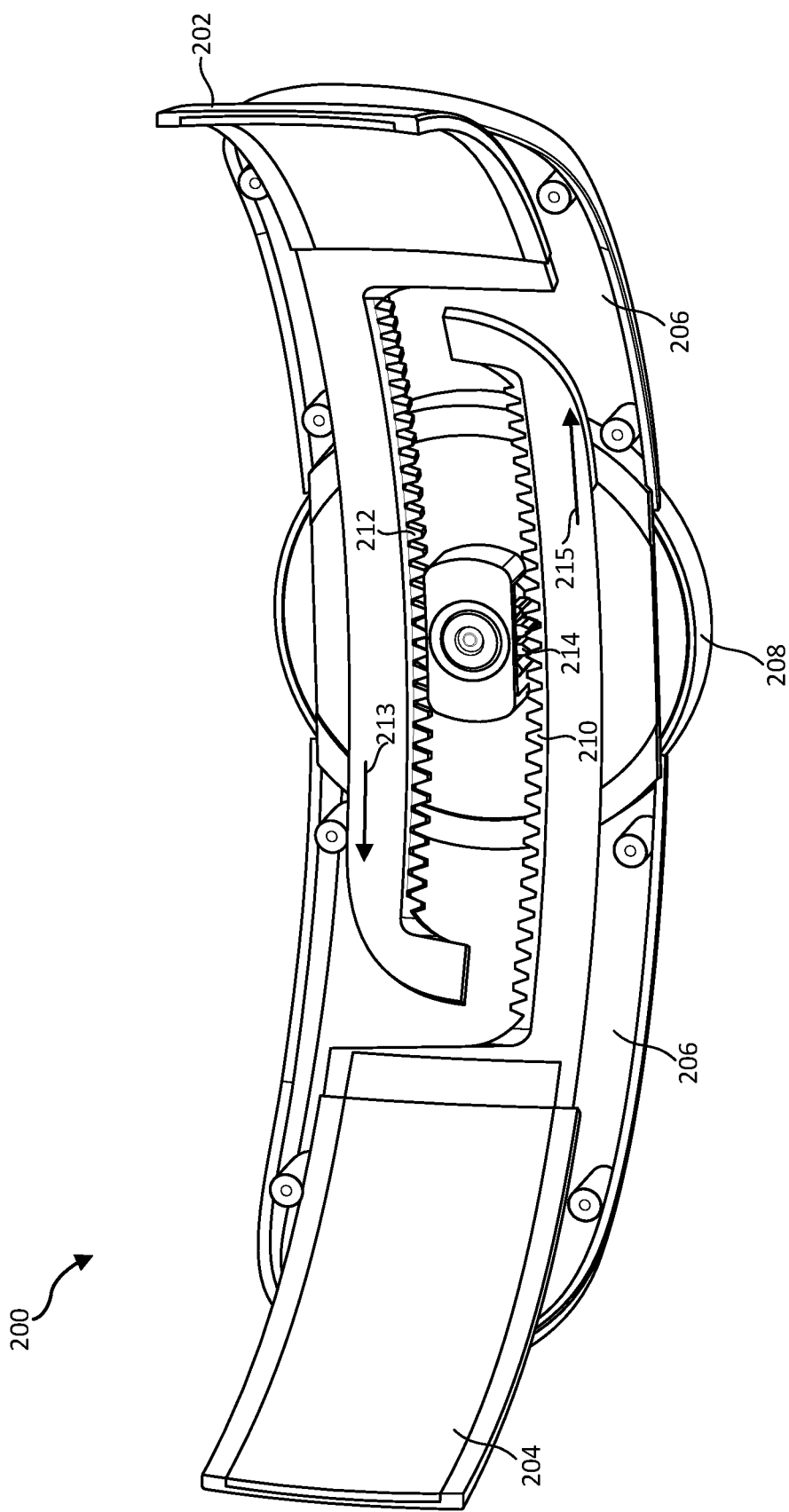
FIG. 2 is a cutaway view of an example adjustable strap system, according to at least one embodiment of the present disclosure.

FIG. 2 is a cutaway view of an example adjustable strap system 200. FIG. 2 shows a strap length adjustment mechanism that includes right strap 204 secured to a first rack 210 and a left strap 202 secured to a second rack 212. First rack 210 and second rack 212 may be disposed within covers 206. Covers 206 may provide an aesthetically pleasing look for adjustable strap system 200 and function as guides for right strap 204 and/or left strap 202 as right strap 204 and/or left strap 202 are lengthened or shortened. As described above in reference to FIG. 1, adjustment knob 208 may be rotated in an engaging direction causing the lengths of left strap 202 and/or right strap 204 to decrease. As will be described in more detail below with reference to FIGS. 3A-6, rotation of adjustment knob 208 may directly and/or indirectly cause pinion gear 214 to rotate. Pinion gear 214 may be configured and positioned to engage with (e.g., mesh with) the gear teeth of first rack 210 and second rack 212 such that rotation of pinion gear 214 causes lateral motion of first rack 210 and second rack 212.

For example, when adjustment knob 208 is rotated in an engaging direction, pinion gear 214 rotates in a counter-clockwise direction (as viewed from the perspective of FIG. 2) such that first rack 210 moves in a direction indicated by arrow 215 and second rack 212 moves in a direction indicated by arrow 213. This engaging movement of first rack 210 and second rack 212 may cause a decrease in the length of left strap 202 and/or right strap 204. Similarly, when adjustment knob 208 is rotated in a disengaging direction, pinion gear 214 rotates in a clockwise direction (as viewed from the perspective of FIG. 2) such that first rack 210 moves in a direction opposite the direction indicated by arrow 215 and second rack 212 moves in a direction opposite the direction indicated by arrow 213. This disengaging movement of first rack 210 and second rack 212 may cause an increase in the length of left strap 202 and/or right strap 204. Right strap 204 and left strap 202 may be secured to a head-worn device. Adjustable strap system 200 may include at least one braking element that holds the tension set by the user and a lengthening mechanism (e.g., a spiral spring) that increases the length of left strap 202 and/or right strap 204 when the user is removing the head-worn device.

Figure 3A:
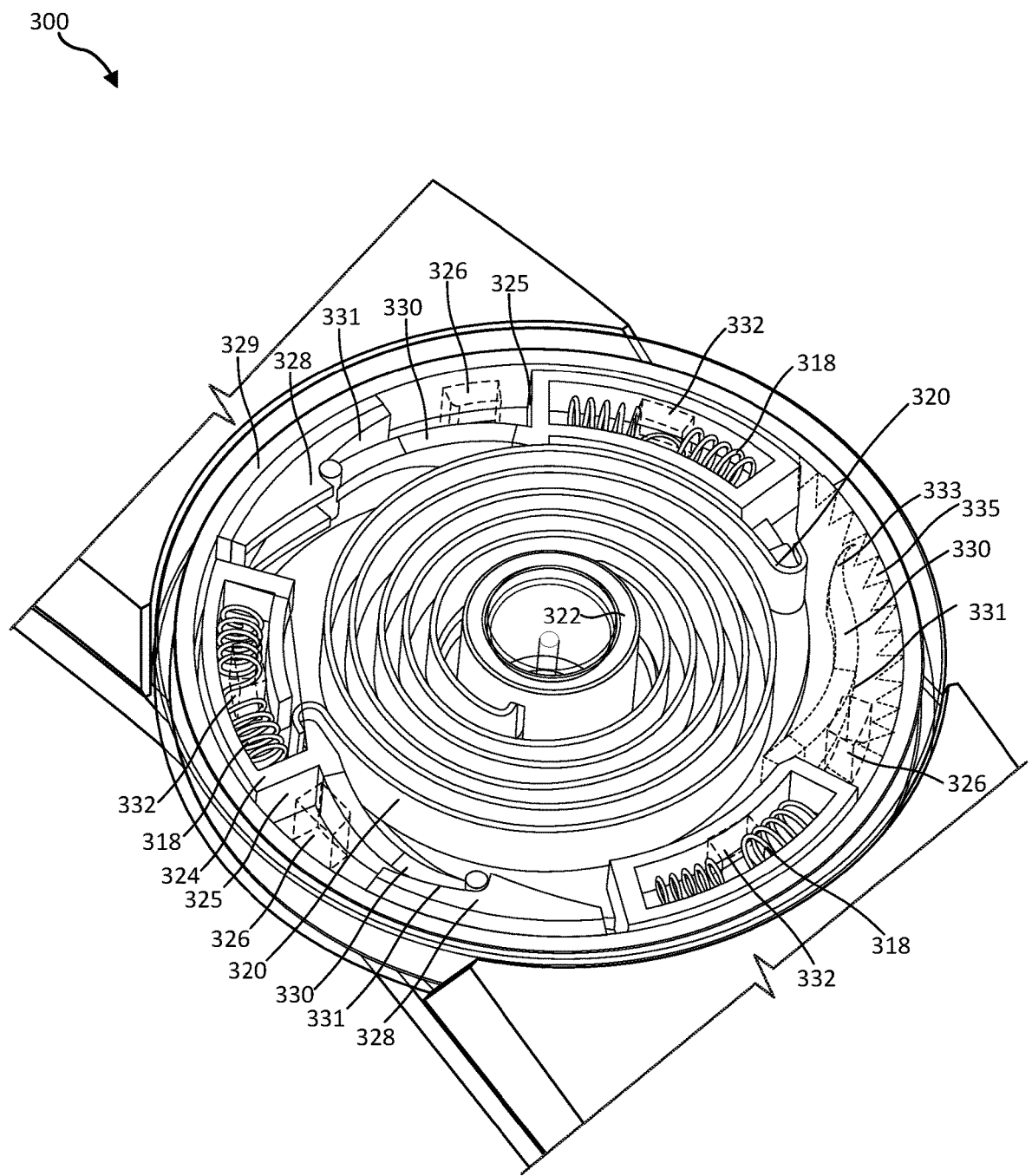
FIG. 3A is cutaway view of an example tensioning mechanism of an adjustable strap system, according to at least one embodiment of the present disclosure.

FIG. 3A is cutaway view of a tensioning mechanism 300 for an example adjustable strap system. Tensioning mechanism 300 may allow a user to set the tension of an adjustable strap system (e.g., that is secured to a head-worn device) and provide additional travel length to the straps. Tensioning mechanism 300 may be configured to enable a user to remove the head-worn device or otherwise stretch the strap system without changing the set tension. As described above with reference to FIGS. 1 and 2, rotating an adjustment knob (not shown in FIG. 3A) may set the strap length and/or tension. The adjustment knob may include at least one positioning peg 332 secured to an inner surface of the adjustment knob (e.g., positioning peg 332 faces into tensioning mechanism 300). Positioning peg 332 may be disposed in the center of spring 318 (e.g., a compression spring) such that rotating the adjustment knob in an engaging direction compresses a first side of spring 318 and rotating the adjustment knob in a disengaging direction compresses a second, opposite side of spring 318. When no rotational force is applied to the adjustment knob, spring 318 returns to a resting (e.g., nominal) position, thereby returning the adjustment knob to a resting position.

The adjustment knob may also include at least one cam peg 326 secured to the inner surface of the adjustment knob. Cam peg 326 and positioning peg 332 may be configured and positioned on the inner surface of the adjustment knob such that rotation of the adjustment knob applies an equal amount of rotational travel (e.g., angular distance) to cam peg 326 and positioning peg 332. When the adjustment knob and spring 318 are in a resting position, at least one braking element 328 (e.g., a brake shoe, a brake pad, a pawl, etc.) disposed adjacent to an inner surface of drum 329 (e.g., a brake drum) may apply a normal force to the inner surface of drum 329. Although FIG. 3A shows three braking elements 328, embodiments of the present disclosure may include any number of braking elements 328. In some examples, tensioning mechanism 300 may include two braking elements 328, which may be disposed diametrically opposite from each other. The normal force may induce a sufficient static frictional force between the inner surface of drum 329 and the surface of braking element 328 that contacts the inner surface of drum 329 to maintain the length of the right strap and the left strap. The length of the right strap and the left strap may be maintained by engagement (e.g., pressing) of braking element 328 against the inner surface of drum 329.

The normal force may be generated by a brake engagement element 330 (e.g., a cam arm) that is configured to press braking element 328 toward the inner surface of drum 329 to directly and/or indirectly inhibit movement of the pinion gear and maintain the user's tension and/or strap length setting.

In some examples, when the adjustment knob is rotated (e.g., rotated by a user) in an engaging direction to decrease the length of the straps, cam peg 326 may press against a surface 325 of adjustment plate 324 such that adjustment plate 324 rotates with the adjustment knob in the engaging direction. Rotating the adjustment knob in an engaging direction may also cause the cam on brake engagement element 330 to travel down a sloped surface 331 on braking element 328 to reduce a normal force on braking element 328 toward the inner surface of drum 329. Reducing the normal force holding braking element 328 against the inner surface of drum 329 may reduce the static frictional force to release braking element 328 from the inner surface of drum 329. This reduction in static friction may allow braking element 328 the freedom to travel along the inner surface of drum 329, which may also result in the pinion gear adjusting (e.g., decreasing) the length of the straps. When the user stops rotating the adjustment knob, spring 318 may return positioning peg 332 to a resting position (e.g., approximately centered within spring 318) and may return the cam on brake engagement element 330 to a position up sloped surface 331 such that braking element 328 reapplies the normal force to the inner surface of drum 329. Reapplying the normal force to the inner surface of drum 329 may inhibit (e.g., reduce or eliminate) relative movement between braking element 328 and drum 329, causing the strap tension and/or lengths to be set.

Braking element 328 may include a friction material that may contact the inner surface of drum 329 to create static friction and a holding force between braking element 328 and the inner surface of drum 329. In some examples, the tribological properties of the surface of braking element 328 may be matched to the inner surface of drum 329 in order to increase the holding force. Braking element 328 may include any type of friction material including, without limitation, ceramic fiber, metal compound, carbon, nanocomposite, an elastomer material, organic fiber, steel fiber, or a combination thereof.

In some examples, brake engagement element 330 may include a pawl 333 and the inner surface of drum 329 may include a ratchet rack 335. In this embodiment, the braking force may be based on the mechanical engagement of pawl 333 with ratchet rack 335 rather than tribological properties of the surface of braking element 328 and the inner surface of drum 329. Pawl 333 and ratchet rack 335 may prevent rotation of the pinion to set the length and/or tension of the straps. Ratchet rack 335 may include gear teeth configured and positioned within the inner surface of drum 329. In some examples, the gear teeth of the ratchet rack 335 may be uniform but asymmetrical, with each tooth having a moderate slope on one edge and a steeper slope on the other edge. The spacing of the gear teeth may be sized to reduce the amount of backlash and potential clicking sound as the pawl moves over each tooth. When the gear teeth are moving in the unrestricted engaging direction, pawl 333 may slide up and over the sloped edges of the gear teeth, with brake engagement element 330 providing a normal force into the depression between the gear teeth as it passes the tip of each gear tooth. Pawl 333 may be positioned at an angle with respect to the gear teeth that prevents motion in the disengaging direction by causing pawl 333 to jam against the gear teeth of ratchet rack 335. When the gear teeth move in the disengaging direction, cam peg 326 may remove the normal force and allow pawl 333 to disengage from the gear teeth allowing rotation in the disengaging direction.

In some examples, when the adjustment knob is rotated (e.g., rotated by a user) in a disengaging direction in order to increase the length of the straps, cam peg 326 may press against a surface of brake engagement element 330 in a direction towards the center of tensioning mechanism 300. The normal force holding braking element 328 against drum 329 may be released to reduce or eliminate the static frictional force. This reduction in static friction may allow braking element 328 the freedom to move relative to the inner surface of drum 329 and to allow the pinion gear to adjust (e.g., increase) the length of the straps. When the user stops rotating the adjustment knob, spring 318 may return positioning peg 332 to a resting position (e.g., approximately centered within spring 318). Thus, the force applied by cam peg 326 on brake engagement element 330 may be removed, allowing brake engagement element 330 to restore the normal force to braking element 328. Restoring the normal force applied by brake engagement element 330 to braking element 328 may, in turn, restore the static friction between braking element 328 and the inner surface of drum 329, causing the strap length and/or tension to be set.

In some examples, after the strap lengths have been set by rotating the adjustment knob in an engaging direction to decrease (e.g., shorten) the strap lengths or a disengaging direction to increase (e.g., lengthen) the length of the straps, a biasing element(s) (e.g., a spring(s)) may be positioned and configured to allow for an increase in the length of at least one of the straps when a tension force is applied to the straps. The tension force may be applied by a user pulling the head-worn device attached to the straps away from the user's head and/or by applying a tension force to the straps.

The increase in length in the straps may allow the user to remove the head-worn device in a more comfortable fashion as compared to a head-worn device that does not include tensioning mechanism 300. Further, tensioning mechanism 300 may allow the user to comfortably don and doff the head-worn device while maintaining the set strap lengths. For example, the biasing element may include one or more springs 320 that may be configured to allow for an increase in the length of the straps when a tension force is applied to the straps. This increase in the length of the straps may be about 5 mm, about 10 mm, about 15 mm, about 20 mm, or about 25 mm. The example embodiment shown in FIG. 3A includes two springs 320, however any number of springs 320 may be included in tensioning mechanism 300. Further, although FIG. 3A shows two interleaved (e.g., nested) spiral springs 320, any type of spring (e.g., a clock spring, a torsion spring, etc.) or any other type of biasing element (e.g., an elastic member) may be included in tensioning mechanism 300. For example, spiral springs 320 may include any type of spring material including, without limitation, spring steel, stainless steel, titanium, alloy steel, high carbon steel, or a combination thereof.

As shown in FIG. 3A, each of the two spiral springs 320 may be nested in one another. Springs 320 may include inner tangs that are attached to pinion gear 322 and outer tangs that are attached to adjustment plate 324. Adjustment plate 324 may transfer (e.g., translate) the torque generated by springs 320 into brake engagement element 330. Brake engagement element 330 may abut (e.g., travel up) the sloped surface of braking element 328 to develop the normal force between braking element 328 and the inner surface of drum 329.

Figure 3B:
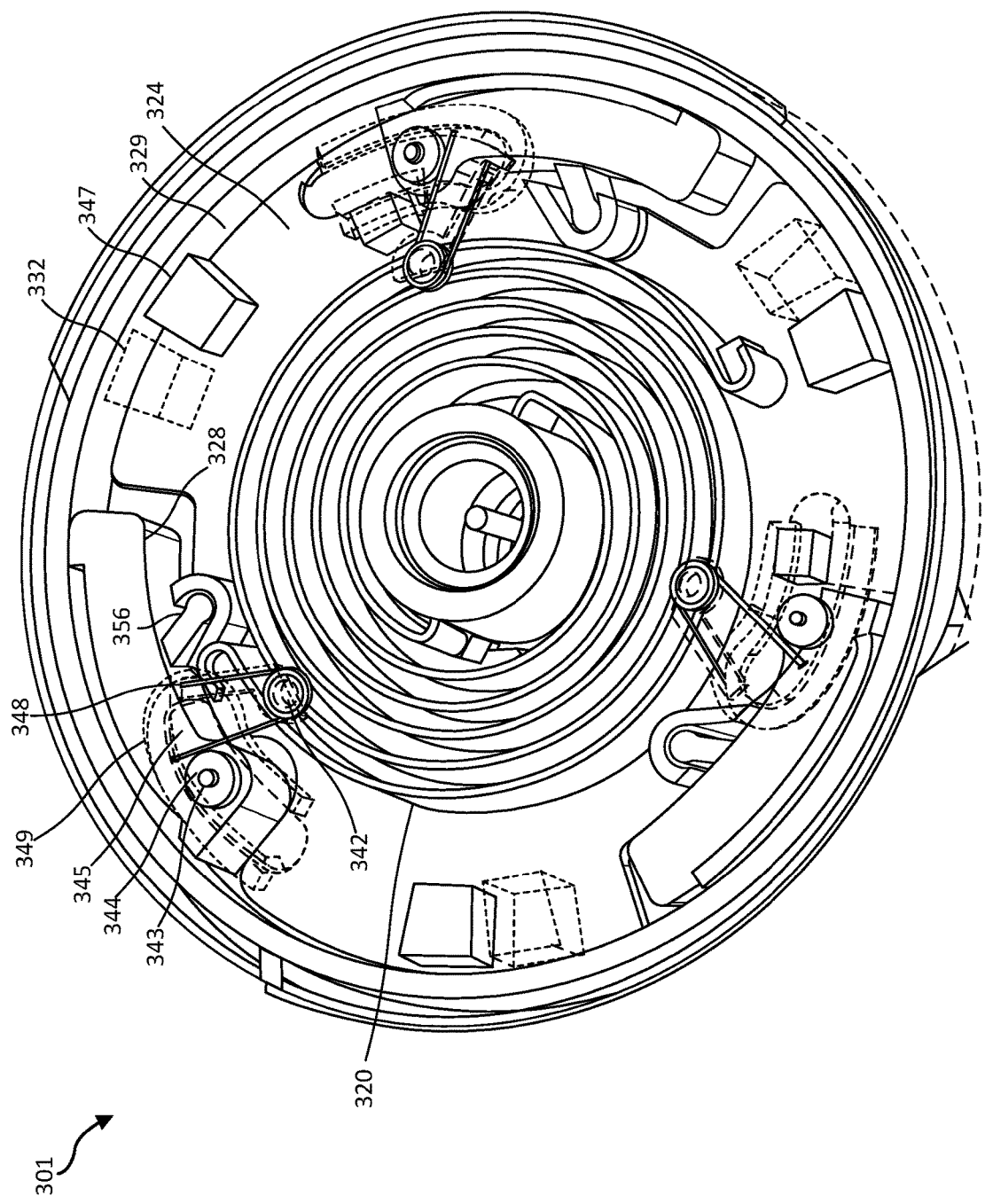
FIG. 3B is cutaway view of another example tensioning mechanism of an adjustable strap system, according to at least one embodiment of the present disclosure.

FIG. 3B is cutaway view of a tensioning mechanism 301 for an example adjustable strap system. Tensioning mechanism 301 may allow a user to set the tension of an adjustable strap system (e.g., that is secured to a head-worn device) and may provide additional travel length to the straps. Tensioning mechanism 301 may be configured to enable a user to remove the head-worn device or otherwise stretch the strap system without changing the set tension. As described above with reference to FIGS. 1-3A, rotating an adjustment knob (not shown in FIG. 3B) may set the strap length and/or tension.

When the adjustment knob is in a static position (e.g., not being rotated), at least one braking element 328 (e.g., a brake shoe, a brake pad, a pawl, etc.) disposed adjacent to an inner surface of drum 329 (e.g., a brake drum) may apply a normal force to the inner surface of drum 329. Although FIG. 3B shows three braking elements 328, embodiments of the present disclosure may include any number of braking elements 328. In some examples, tensioning mechanism 300 may include two braking elements 328, which may be disposed diametrically opposite from each other. The normal force may induce a sufficient static frictional force between the inner surface of drum 329 and the surface of braking element 328 that contacts the inner surface of drum 329 to maintain the length of the right strap and the left strap. The length of the right strap and the left strap may be maintained by the engagement (e.g., pressing) of braking element 328 against the inner surface of drum 329.

The normal force may be generated by a lever arm 356 that is configured to press braking element 328 toward the inner surface of drum 329 to directly and/or indirectly inhibit movement of the pinion gear and maintain the user's tension and/or strap length setting. In some examples, braking element 328 may include a bearing 344 that is configured to travel within a slot 345 in cam 349. Bearing 344 may be secured to braking element 328 by an axle 343. Bearing 344 may rotate about axle 343. Bearing 344 may be secured to braking element 328 by axle 343 such that a force applied to bearing 344 in a direction towards the inner surface of drum 329 may cause braking element 328 to apply a normal force against the inner surface of drum 329, thereby holding the adjustment knob in place with respect to drum 329. Slot 345 in cam 349 may be configured (e.g., tapered) such that the position of cam 349 with respect to bearing 344 controls the distance of braking element 328 from the inner surface of drum 329, thereby controlling the friction between braking element 328 and the inner surface of drum 329. When the adjustment knob is in a static position, bearing 344 may be positioned within slot 345 of cam 349 to apply a normal force to braking element 328 against the inner surface of drum 329 thereby holding the adjustment knob in place with respect to drum 329. When the adjustment knob is rotated in either an engaging or disengaging direction, bearing 344 may be positioned within slot 345 of cam 349 to reduce the normal force from braking element 328 against the inner surface of drum 329, thereby removing the frictional force between braking element 328 and drum 329 and allowing the adjustment knob and pinion gear to rotate.

The adjustment knob may include at least one positioning peg 332 secured to an inner surface of the adjustment knob (e.g., positioning peg 332 faces into tensioning mechanism 301). When the adjustment knob is rotated (e.g., rotated by a user) in an engaging direction to decrease the length of the straps, positioning peg 332 may press against a base peg 347 of adjustment plate 324 such that adjustment plate 324 rotates with the adjustment knob in the engaging direction. Rotating the adjustment knob in an engaging direction may also cause slot 345 of cam 349 to pull bearing 344 and braking element 328 away from drum 329 and reduce the normal force on braking element 328. Reducing the normal force holding braking element 328 against the inner surface of drum 329 may reduce the static frictional force to release braking element 328 from the inner surface of drum 329. This reduction in the static frictional force may allow braking element 328 the freedom to travel along the inner surface of drum 329, which may also result in the pinion gear adjusting (e.g., decreasing) the length of the straps. When the user stops rotating the adjustment knob, restoring spring 348 may return bearing 344 to a position within slot 345 of cam 349 such that braking element 328 reapplies the normal force to the inner surface of drum 329. Restoring spring 348 may include a torsion spring that that is secured to the adjustment knob by pivot pin 342. Reapplying the normal force to the inner surface of drum 329 may inhibit (e.g., reduce or eliminate) relative movement between braking element 328 and drum 329, causing the strap tension and/or lengths to be set.

Braking element 328 may include a friction material that may contact the inner surface of drum 329 to create static friction and a holding force between braking element 328 and the inner surface of drum 329. In some examples, the tribological properties of the surface of braking element 328 may be matched to the inner surface of drum 329 in order to increase the holding force. Braking element 328 may include any type of friction material including, without limitation, ceramic fiber, metal compound, carbon, nanocomposite, an elastomer material, organic fiber, steel fiber, or a combination thereof.

In some examples, when the adjustment knob is rotated (e.g., rotated by a user) in a disengaging direction in order to increase the length of the straps, cam 349 may move bearing 344 in slot 345 in a direction towards the center of tensioning mechanism 301. Moving bearing 344 towards the center of tensioning mechanism 301 may move braking element 328 away from the inner surface of drum 329. The normal force holding braking element 328 against drum 329 may be released by this movement to reduce or eliminate the static frictional force. This reduction in the static frictional force may allow braking element 328 the freedom to move relative to the inner surface of drum 329 and to allow the pinion gear to adjust (e.g., increase) the length of the straps. When the user stops rotating the adjustment knob, restoring spring 348 may return cam 349 to a position that restores the normal force on bearing 344. Restoring the normal force applied by bearing 344 to braking element 328 may, in turn, restore the static frictional force between braking element 328 and the inner surface of drum 329, causing the strap length and/or tension to be set.

In some examples, after the strap lengths have been set by rotating the adjustment knob in an engaging direction to decrease (e.g., shorten) the strap lengths or a disengaging direction to increase (e.g., lengthen) the length of the straps, a biasing element(s) (e.g., one or more springs) may be positioned and configured to allow for an increase in the length of at least one of the straps when a tension force is applied to the straps. The tension force may be applied by a user pulling the head-worn device attached to the straps away from the user's head and/or by applying a tension force to the straps. The increase in length in the straps may allow the user to remove the head-worn device in a more comfortable fashion as compared to a head-worn device that does not include tensioning mechanism 301. Further, tensioning mechanism 301 may allow the user to comfortably don and doff the head-worn device while maintaining the set strap lengths. For example, the biasing element may include one or more springs 320 that may be configured to allow for an increase in the length of the straps when a tension force is applied to the straps.

The example embodiment shown in FIG. 3B includes two springs 320, however any number of springs 320 may be included in tensioning mechanism 301. Further, although FIG. 3B shows two interleaved (e.g., nested) spiral springs 320, any type of spring (e.g., a clock spring, a torsion spring, etc.) or any other type of biasing element (e.g., an elastic member) may be included in tensioning mechanism 301. For example, spiral springs 320 may include any type of spring material including, without limitation, spring steel, stainless steel, titanium, alloy steel, high carbon steel, or a combination thereof.

Figure 3C:
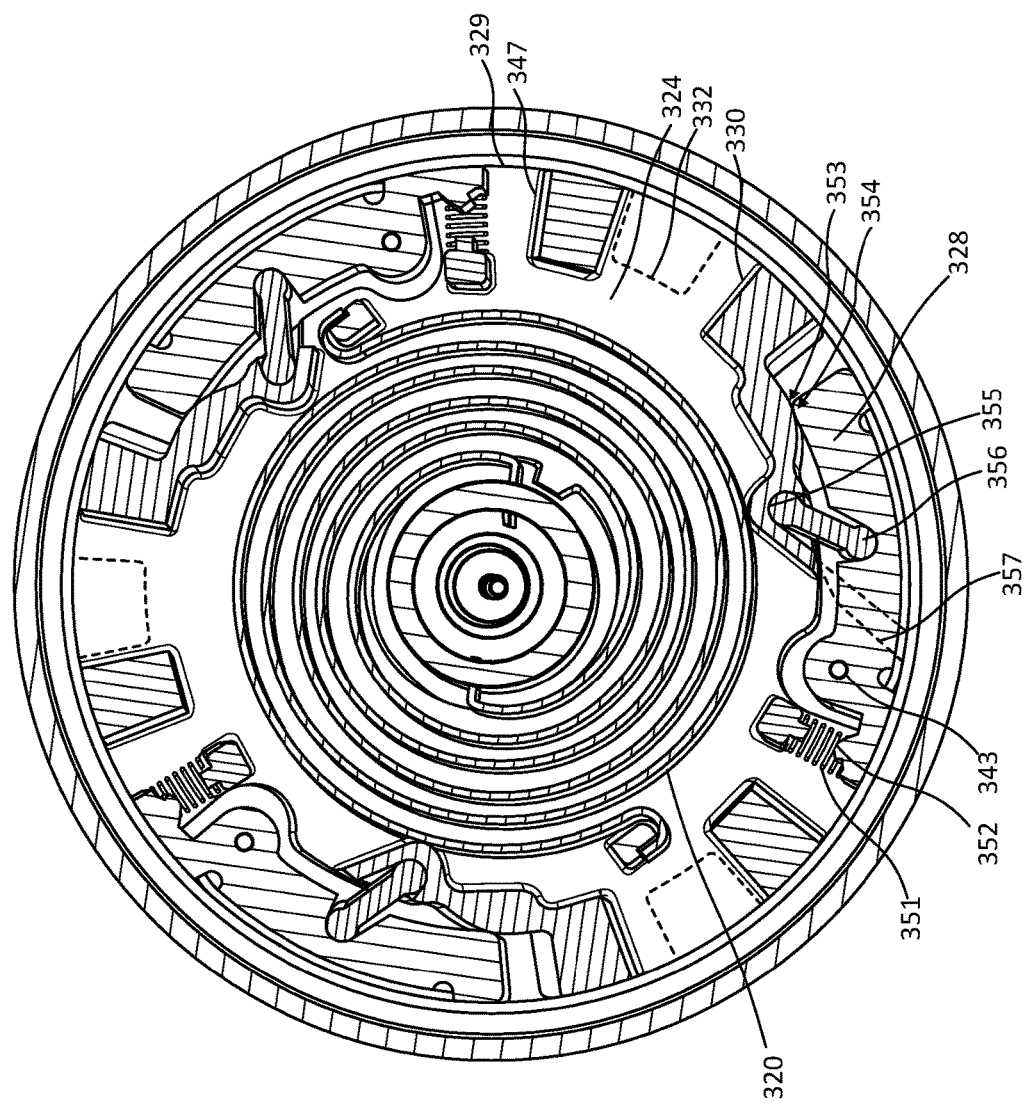
FIG. 3C is cross-sectional view of another example tensioning mechanism of an adjustable strap system, according to at least one embodiment of the present disclosure.

FIG. 3C is cutaway view of a tensioning mechanism 302 for an example adjustable strap system, according to additional embodiments of the present disclosure. In some respects, tensioning mechanism 302 of FIG. 3C may be similar to tensioning mechanism 301 discussed above with reference to FIG. 3B. For example, tensioning mechanism 301 may include at least one braking element 328 and a drum 329 against which braking element 328 may apply a normal force. Braking element 328 may be configured to rotate about an axle 343. A lever arm 356 may be configured to press braking element 328 toward drum 329. Tensioning mechanism 302 may also include an adjustment knob (not shown in FIG. 3C) to set the strap length and/or tension, at least one positioning peg 332 secured to the adjustment knob and at least one base peg secured to adjustment plate 324. Tensioning mechanism 302 may also include one or more springs 320 that may be configured to allow for an increase in the length of the straps when a tension force is applied to the straps.

The normal force may be generated by a brake engagement element 330 that is configured to directly and/or indirectly press braking element 328 toward the inner surface of drum 329 to inhibit movement of the pinion gear and maintain the user's tension and/or strap length setting. When the adjustment knob is rotated in either an engaging or disengaging direction, brake engagement element 330 may be configured to reduce the normal force from braking element 328 against the inner surface of drum 329, thereby removing the frictional force between braking element 328 and drum 329 and allowing the adjustment knob and pinion gear to rotate in order to adjust a length of the straps.

Tensioning mechanism 302 may include at least one spring 351 (e.g., a compression spring) that applies a normal force to braking element portion 352. When the adjustment knob is rotated in the engaging direction, brake engagement element 330 may reduce the normal force on braking element 328 allowing the normal force exerted by spring 351 to pivot braking element 328 away from the inner surface of drum 329, thereby removing the frictional force between braking element 328 and drum 329. When the user stops rotating the adjustment knob, brake engagement element 330 may be configured to reapply the normal force to braking element 328 creating static friction between braking element 328 and inner surface of drum 329 sufficient to hold the adjustment knob in a static position.

In some examples, brake engagement element 330 may be configured to apply the normal force to braking element 328 through multiple contact points between brake engagement element 330 and braking element 328. For example, brake engagement element 330 may be shaped such that a contact point 353 (e.g., a first contact point) may apply a normal force to an end portion 354 of braking element 328. Additionally or alternatively, brake engagement element 330 may include a socket 355 that is shaped and configured to apply a force at lever arm 356 (e.g., a second contact point). The force applied to lever arm 356 may be transferred to braking element 328 at a position on braking element 328 different from end portion 354 (e.g., a position towards a center section of braking element 328). Applying a normal force to braking element 328 at multiple contact points (e.g., at contact point 353 and lever arm 356) may increase the static friction and holding force between braking element 328 and the inner surface of drum 329, compared to embodiments that apply force to braking element 328 at only a single location.

Figure 4:
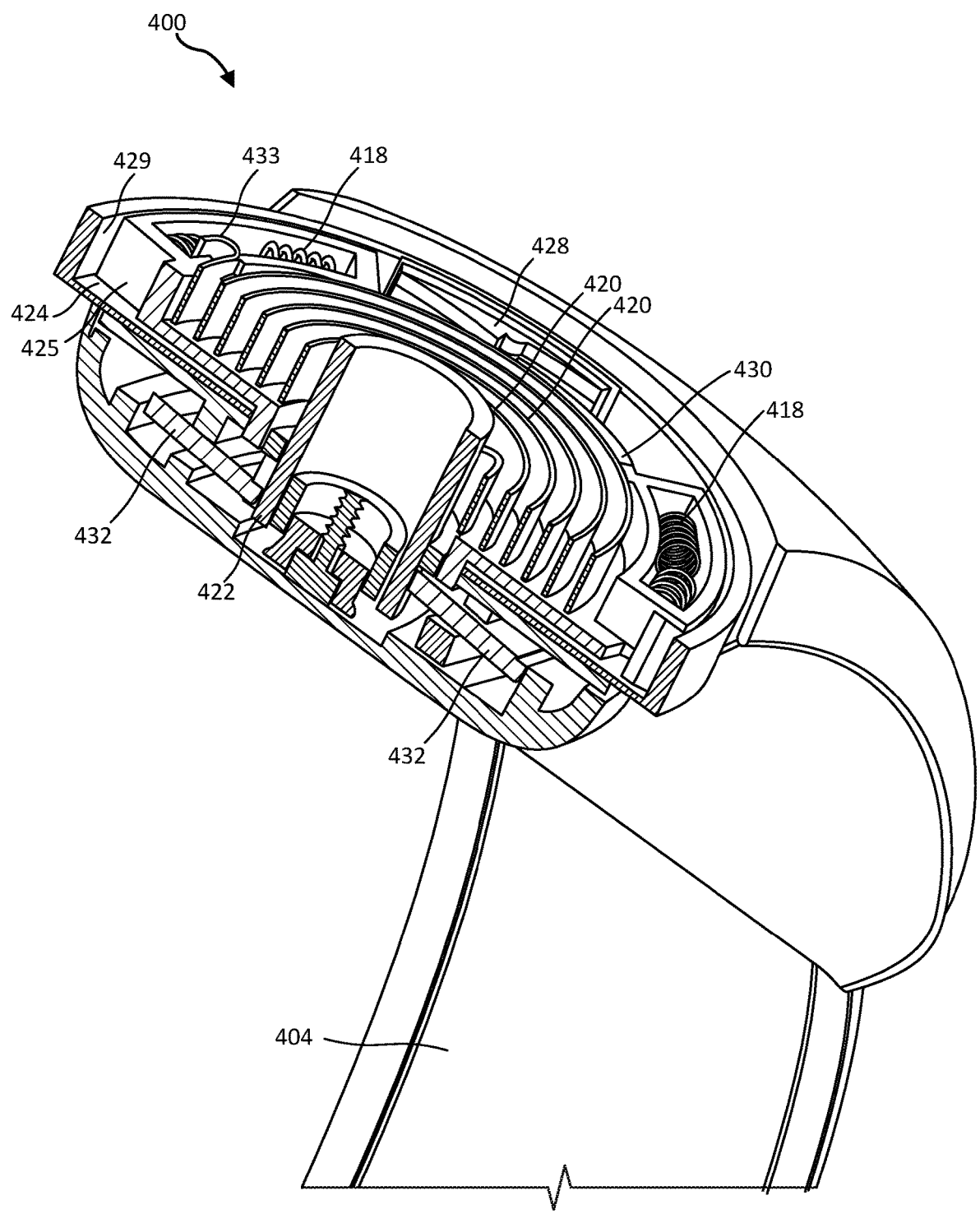
FIG. 4 is a cutaway cross-sectional view of an example adjustable strap system, according to at least one embodiment of the present disclosure.

FIG. 4 is a cross-sectional view of an example adjustable strap system 400. Adjustable strap system 400 may include tensioning mechanism 300 of FIG. 3A, tensioning mechanism 301 of FIG. 3B, and/or tensioning mechanism 302 of FIG. 3C. Adjustable strap system 400 may allow a user to set the tension of straps secured to a head-worn device and provide additional travel length to right strap 404 and/or left strap (not shown in FIG. 4) such that a user may remove the head-worn device without changing the set tension. As described above with reference to FIGS. 1-3B, rotating an adjustment knob (not shown in FIG. 4) may set the strap positions and/or strap tensions. As discussed above with reference to FIGS. 3A and 3B, the adjustment knob may include at least one positioning peg (not shown in FIG. 4) secured to the inner surface of the adjustment knob. The positioning peg may be disposed in the center of spring 418 (e.g., a compression spring) such that rotating the adjustment knob in an engaging direction compresses a first side of spring 418 and rotating the adjustment knob in a disengaging direction compresses a second, opposite side of spring 418. When no rotational force is applied to the adjustment knob, spring 418 returns to a resting (e.g., nominal) position, thereby returning the adjustment knob to a resting position.

The adjustment knob may include at least one cam peg (not shown in FIG. 4) secured to the inner surface of the adjustment knob. The cam peg and the positioning peg may be configured and positioned on the inner surface of the adjustment knob such that rotation of the adjustment knob applies an equal amount of rotational travel (e.g., angular distance) to the cam peg and the positioning peg. When the adjustment knob and spring 418 are in a resting position, at least one braking element 428 (e.g., a brake shoe, a brake pad, a pawl, etc.) disposed adjacent to an inner surface of a drum 429 may apply a normal force to the inner surface of drum 429 (e.g., a brake drum, a ratchet rack, etc.) such that a static frictional force between the inner surface of drum 429 and the surface of braking element 428 that contacts the inner surface of drum 429 may maintain the length of right strap 404 and the left strap. The length of right strap 404 and the left strap may be maintained by engagement of braking element 428 against the inner surface of drum 429. The normal force may be generated by a brake engagement element 430 that is configured to press braking element 428 toward the inner surface of drum 429 to directly and/or indirectly inhibit movement of pinion gear 422 and maintain the user's tension and/or strap length setting.

In some examples, when the adjustment knob is rotated (e.g., rotated by a user) in an engaging direction to decrease the length of the straps, the cam peg may press against a surface of adjustment plate 425 such that adjustment plate 425 rotates with the adjustment knob in the engaging direction. Rotating the adjustment knob in an engaging direction may also cause the cam on brake engagement element 430 to travel along a sloped surface on braking element 428 to reduce (e.g., release) a pressure applied by braking element 428 on the inner surface of drum 429. This reduction in pressure may decrease the normal force holding braking element 428 against the inner surface of drum 429 and may reduce the static frictional force. This reduction in static friction may allow braking element 428 the freedom to travel adjacent to the inner surface of drum 429 thereby allowing pinion gear 422 to adjust (e.g., decrease) the length of the straps. When the user stops rotating the adjustment knob, spring 418 may return the positioning peg to a resting position (e.g., approximately centered within spring 418) and may return the cam on brake engagement element 430 to a position on the sloped surface such that braking element 428 reapplies the normal force to the inner surface of drum 429. When the normal force is applied by the braking element 428, relative movement between braking element 428 and drum 429 may be inhibited, causing the strap tension and/or lengths to be set.

Braking element 428 may include a material (e.g., a friction material as described above with reference to FIGS. 3A, 3B, and/or 3C) that contacts the inner surface of drum 429 creating static friction and a holding force between the friction material and the inner surface of drum 429. As described above with reference to FIG. 3A, braking element 428 may include a pawl and the inner surface of drum 429 may include a ratchet rack. In this embodiment, the holding force may be based on the mechanical engagement of the pawl with the ratchet rack rather than tribological properties of the surface of braking element 428 and the inner surface of drum 429. The pawl and ratchet rack may prevent rotation of the pinion to set the length and/or tension of the straps.

In some examples, when the adjustment knob is rotated (e.g., by a user) in a disengaging direction to increase the length of the straps, the cam peg that is secured to the adjustment knob may press against a surface of brake engagement element 430 in a direction towards the center of adjustable strap system 400. This may release the normal force holding braking element 428 against drum 429, thereby reducing the static frictional force. This reduction in static friction may allow braking element 428 freedom to travel along the inner surface of drum 429 to allow pinion gear 422 to rotate. Pinion gear 422 may be engaged with the gear teeth of rack(s) 432 and the rotation of pinion gear 422 may cause rack(s) 432 to move outward, resulting in lengthening the straps. When the user stops rotating the adjustment knob, spring 418 may return the positioning peg to a resting position (e.g., approximately centered within spring 418) and may remove the force applied by the cam peg on brake engagement element 430 to restore the normal force applied by brake engagement element 430 to braking element 428. Restoring the normal force may restore the static friction between braking element 428 and the inner surface of drum 429, causing the strap lengths and/or tension to be set.

In some examples, after the strap lengths have been set by rotating the adjustment knob in an engaging direction to decrease (e.g., shorten) the strap lengths or in a disengaging direction to increase (e.g., lengthen) the length of the straps, a biasing element such as springs 420 may be positioned and configured to allow for an increase in the length of at least one of the straps when a tension force is applied to the straps. The tension force may be applied by a user pulling a head-worn device attached to the straps away from the user's head and/or by directly pulling on the straps. The increase in length in the straps may allow the user to remove the head-worn device in a more comfortable fashion as compared to a head-worn device that does not include adjustable strap system 400. Further, adjustable strap system 400 may allow the user to comfortably don and doff the head-worn device while maintaining the set strap lengths. The example embodiment shown in FIG. 4 may include two springs 420, however any number of springs 420 may be included in adjustable strap system 400. Further, although FIG. 4 shows two interleaved (e.g., nested) spiral springs 420, any type of spring (e.g., a clock spring, a torsion spring, etc.) or any other type of biasing element (e.g., an elastomer) may be included in adjustable strap system 400.

As shown in FIG. 4, each of the two spiral springs 420 may be nested in one another. Springs 420 may include inner tangs that are attached to pinion gear 422 and outer tangs 433 that are attached to adjustment plate 424. Adjustment plate 424 may transfer (e.g., translate) the torque generated by springs 420 into brake engagement element 430 which may cam into (e.g., travel up) the sloped surface of braking element 428 to develop the normal force between braking element 428 and the inner surface of drum 429.

Figure 5:
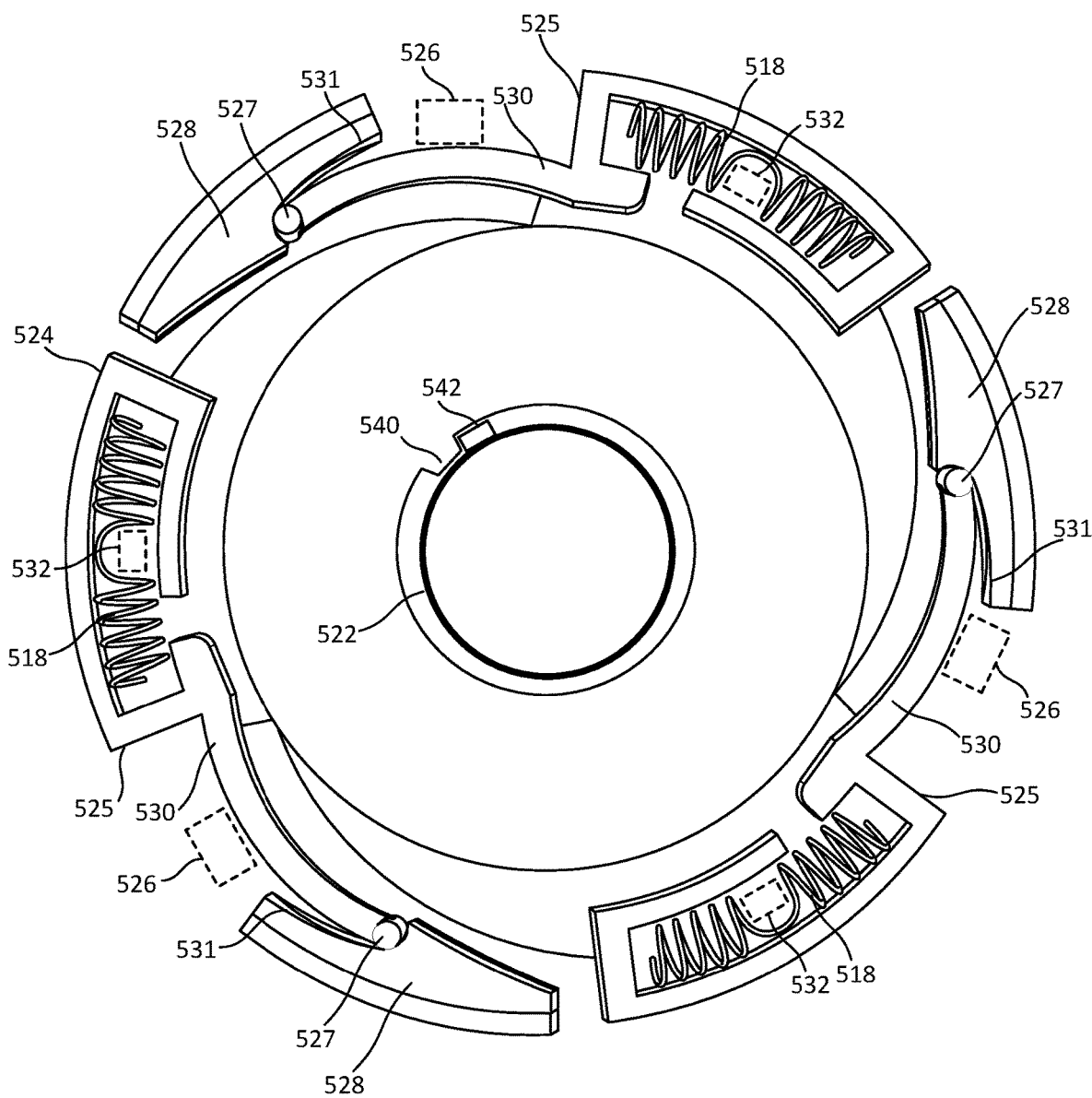
FIG. 5 is a plan view of an example adjustment plate of an adjustable strap system, according to at least one embodiment of the present disclosure.

FIG. 5 is a plan view of an example adjustment plate of an adjustable strap system. FIG. 5 shows a detailed view of the configuration and positioning of adjustment plate 524 with respect to pinion gear 522. As described above with reference to FIGS. 2,-4, pinion gear 522 may engage with the racks positioned on the straps such that rotation of pinion gear 522 adjusts the length and/or tension of the straps. When the adjustment knob (not shown in FIG. 5) is rotated (e.g., rotated by a user) in an engaging direction to decrease the length of the straps, cam peg 526 may press against surface 525 of adjustment plate 524 such that adjustment plate 524 rotates with the adjustment knob in the engaging direction. Rotating the adjustment knob in an engaging direction may also cause cam 527 on brake engagement element 530 to travel down sloped surface 531 on braking element 528 to release braking element 528 from the inner surface of the drum and to decrease the normal force holding braking element 528 against the inner surface of the drum. This decrease in normal force and static friction may allow braking element 528 freedom to travel adjacent to the inner surface of the drum thereby allowing pinion gear 522 to adjust (e.g., decrease) the length of the straps. When the user stops rotating the adjustment knob, spring 518 may return positioning peg 532 to a resting position (e.g., approximately centered within spring 518) and return cam 527 on brake engagement element 530 to a position up sloped surface 531 such that braking element 528 reapplies the normal force to the inner surface of the drum to cause the strap tension and/or lengths to be set.

An initial tension and/or length may be set on the straps by the user's initial rotation setting of the adjustment knob. The initial setting may be maintained by the braking force provided by braking element 528 pressing against the drum. The spiral springs (e.g., springs 420 of FIG. 4) may be in an unloaded state until tension on the straps (e.g., tension caused by the user pulling the HMD away from the user's head) cause the springs to wind. The winding springs may act as an elastic member when tension is applied to the straps and may provide additional strap travel, creating clearance between the user's face and the HMD for comfortable removal of the HMD. When the adjustment knob is rotated in the engaging direction (e.g., clockwise direction in the plan view of FIG. 5) cam peg 526 may release the normal force on cam 527 allowing adjustment plate 524 to rotate. Cam peg 526 may also push against surface 525 of adjustment plate 524 causing tab 540 to push against pinion gear tab 542 and rotate pinion gear 522. The rotation of pinion gear 522 against the racks may cause the straps to decrease in length and increase the strap tension.

When the adjustment knob is rotated in the disengaging direction (e.g., counterclockwise direction in the plan view of FIG. 5) cam peg 526 may push against brake engagement element 530 releasing the normal force on cam 527 allowing adjustment plate 524 to rotate. When adjustment plate 524 rotates in the disengaging direction, tab 540 may disengage from pinion gear tab 542, allowing pinion gear 522 to rotate and the racks to move. Pinion gear 522 may remain coupled to adjustment plate 524 through the spiral springs (not shown in FIG. 5). Allowing pinion gear 522 and the racks to move in this manner may enable the lengths of the straps to be increased by tension being applied to the straps.

Figure 6:
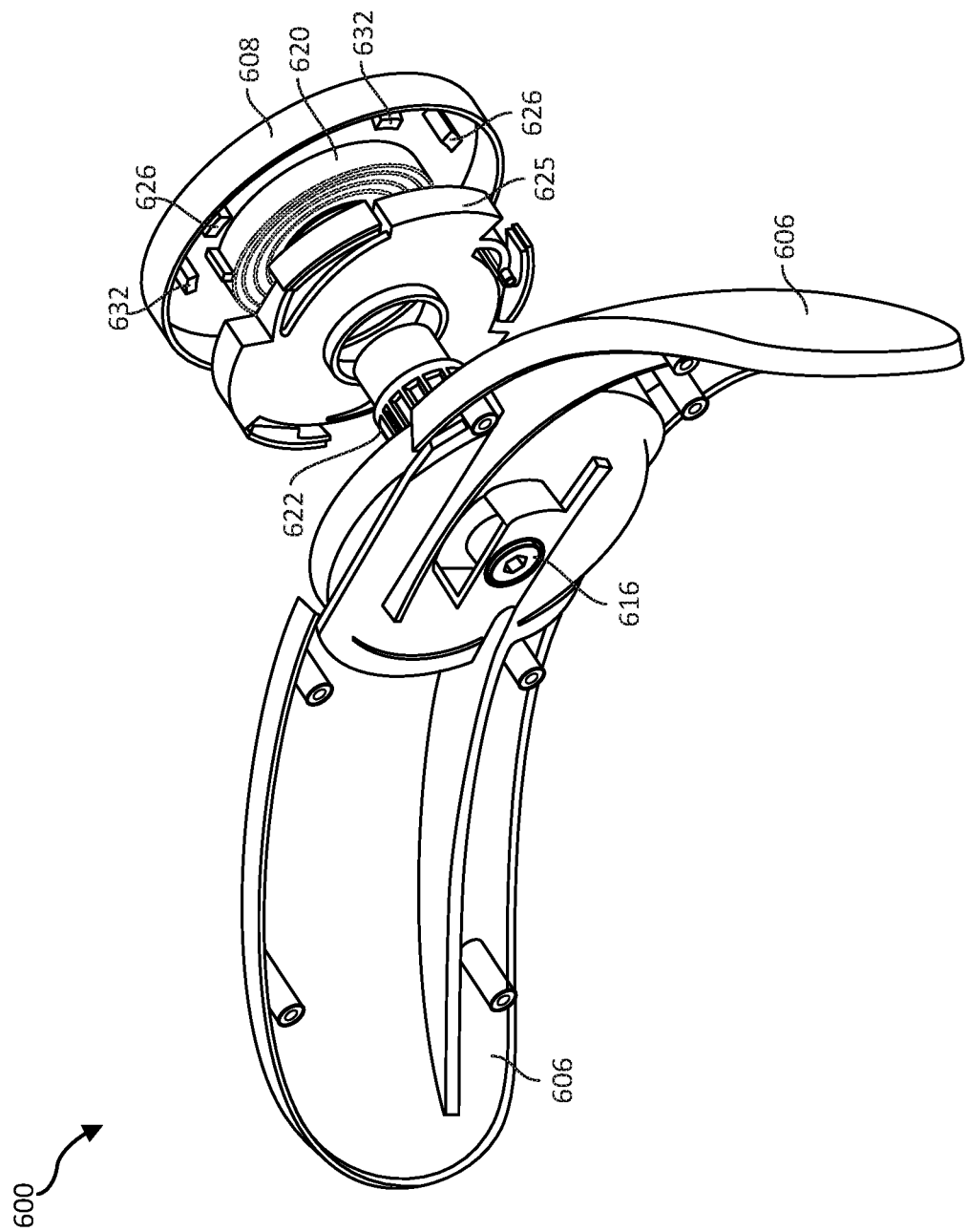
FIG. 6 is an exploded view of an example adjustable strap system, according to at least one embodiment of the present disclosure.

FIG. 6 is an exploded view of an example adjustable strap system 600. Adjustable strap system 600 may allow a user the set the lengths and/or tension of the straps by rotation of adjustment knob 608. Adjustment knob 608 may include cam pegs 626 and positioning pegs 632 that may be configured and positioned on the inner portion of adjustment knob 608 such that rotation of adjustment knob 608 sets the lengths and/or tension of the straps. In some examples, after the strap lengths have been set by rotating the adjustment knob in an engaging direction to decrease (e.g., shorten) the strap lengths or a disengaging direction to increase the length of the straps, a biasing element(s) such as spring 620 may be configured to allow for an increase in the length of at least one of the straps when a tension force is applied to the straps. The tension force may be applied by a user pulling a head-worn device attached to the straps away from the user's face. Adjustable strap system 600 may allow the user to comfortably don and doff the head-worn device while maintaining the set strap lengths.

Spring 620 may include nested spiral springs positioned within adjustment plate 625. Spring 620 may be configured to allow for an increase in the length of the straps when a tension force is applied by winding around pinion gear 622. Pinion gear 622 may be configured and positioned to engage with (e.g., mesh with) the gear teeth of a first rack and a second rack attached the a left strap and a right strap respectively (first rack, second rack, left strap, and right strap are not shown in FIG. 6) such that tension on the first and second rack may cause rotation of pinion gear 622, which may cause spring 620 to wind and allow additional travel length. In some examples, adjustable strap system 600 may include a housing 606 positioned over the first and second racks. Housing 606 may include axle 616 about which pinion gear 622 may rotate.

FIG. 7 is a flow diagram illustrating an example method 700 of manufacturing a strap adjustment device. At operation 710, method 700 may include engaging a first rack extending from a first strap with a pinion gear. Operation 710 may be performed in a variety of ways, as will be understood by one skilled in the art considering the present disclosure. Engaging a first rack extending from a first strap with a pinion gear may include methods as described above with reference to FIGS. 2, 4, and 6.

At operation 720, method 700 may include engaging a second rack extending from a second strap with the pinion gear. Operation 720 may be performed in a variety of ways, as will be understood by one skilled in the art considering the present disclosure. Engaging a second rack extending from a second strap with the pinion gear may include methods as described above with reference to FIGS. 2, 4, and 6.

At operation 730, method 700 may include disposing at least one braking element adjacent to an inner surface of a drum. Operation 730 may be performed in a variety of ways. For example, at least one braking element may be positioned adjacent to an inner surface of a drum as described above with reference to FIGS. 3A-6.

At operation 740, method 700 may include positioning a brake engagement element to press the at least one braking element toward the inner surface of the drum to maintain a length setting of the first strap and the second strap. Operation 740 may be performed in a variety of ways. For example, positioning a brake engagement element to press the at least one braking element toward the inner surface of the drum to maintain a length setting of the first strap and the second strap may be performed as described above with reference to FIGS. 3A-5.

At operation 750, method 700 may include coupling at least one spiral spring to and between the pinion gear and the brake engagement element to allow for an increase in a length of at least one of the first strap or the second strap when a tension force is applied to at least one of the first strap or the second strap. Operation 750 may be performed in a variety of ways. For example, coupling at least one spiral spring to and between the pinion gear and the brake engagement element to allow for an increase in a length of at least one of the first strap or the second strap when a tension force is applied to at least one of the first strap or the second strap may be performed as described above with reference to FIGS. 1-6.

In some examples, manufacturing a strap adjustment device may further include rotatably coupling an adjustment knob to the drum in a position to abut against and move the brake engagement element when the adjustment knob is rotated. Rotatably coupling an adjustment knob to the drum may allow rotation of the adjustment knob to set a proper tension on the straps as described above with reference to FIGS. 1-6.

As described in detail above, the present disclosure details systems, devices, and methods related to an adjustable strap system. Embodiments of the present disclosure may allow the user to rotate an adjustment knob on the adjustable strap system to set the proper tension for the user when donning an HMD but provides additional travel room for the straps to extend without rotating the knob in the opposite direction when donning and/or doffing the head-worn device. The embodiments of the present disclosure allow the user to retain the knob position and tension setting while allowing the user to comfortably remove the head-worn device based on the additional strap travel. Once the desired strap tension is reached, the mechanism may maintain this set point adjustment. Any remaining play in the springs may then be utilized to provide additional strap travel by pulling outwards (e.g., away from the user's face) on the headset, creating clearance for comfortable removal. The initial tension setting may be maintained, allowing for a "set it and forget it" adjustment.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
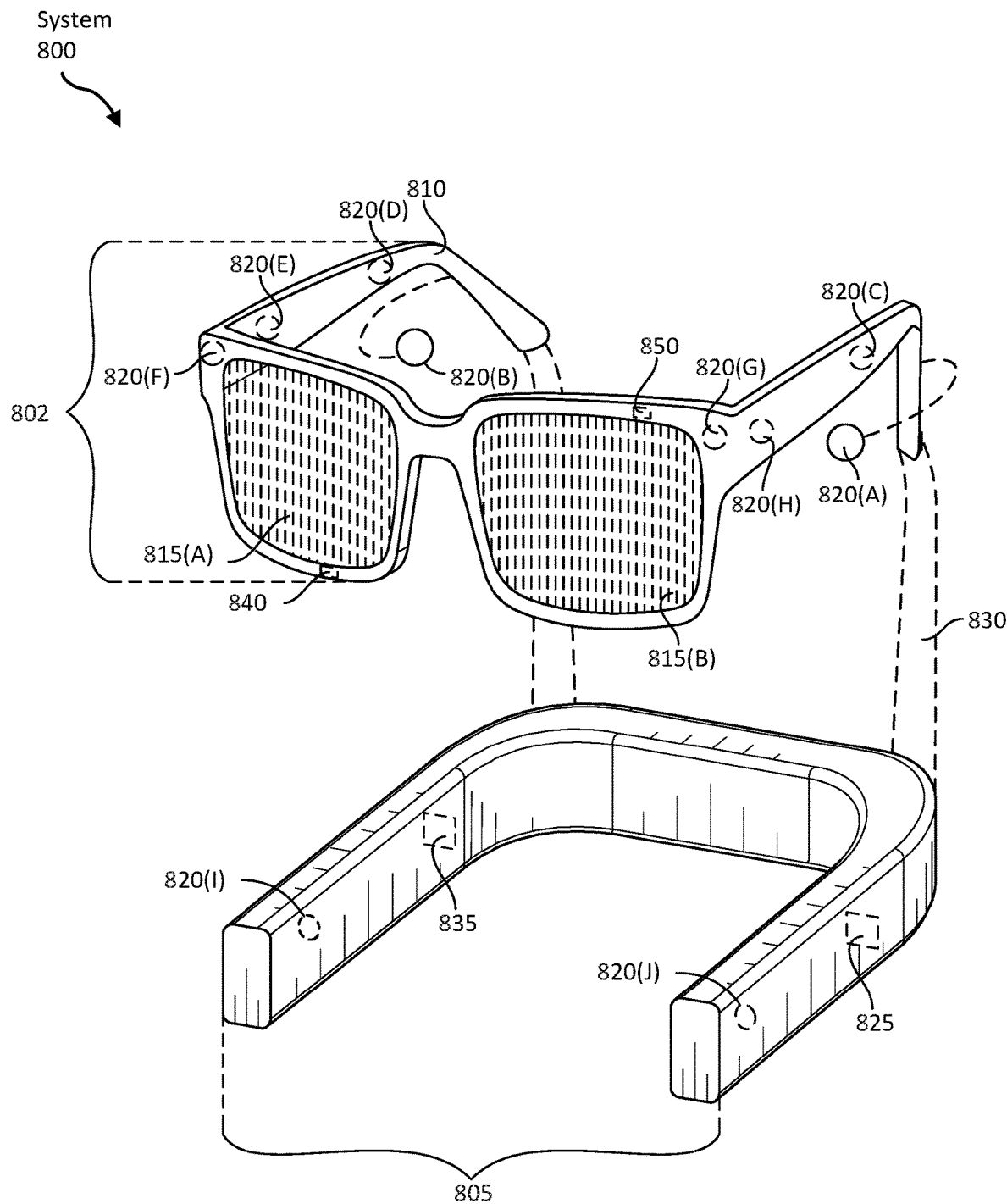
FIG. 8 is an illustration of exemplary augmented reality glasses that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 81220 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(*I*) and 820(J), which may be positioned on a corresponding neckband 805.

In some embodiments, one or more of acoustic transducers 820(A)-(F) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a Bluetooth connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(1) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820 (D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 (e.g., adjustable strap system 100, 200, 400, 600 described above) shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

As noted, artificial-reality systems 800 and 900 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 10:
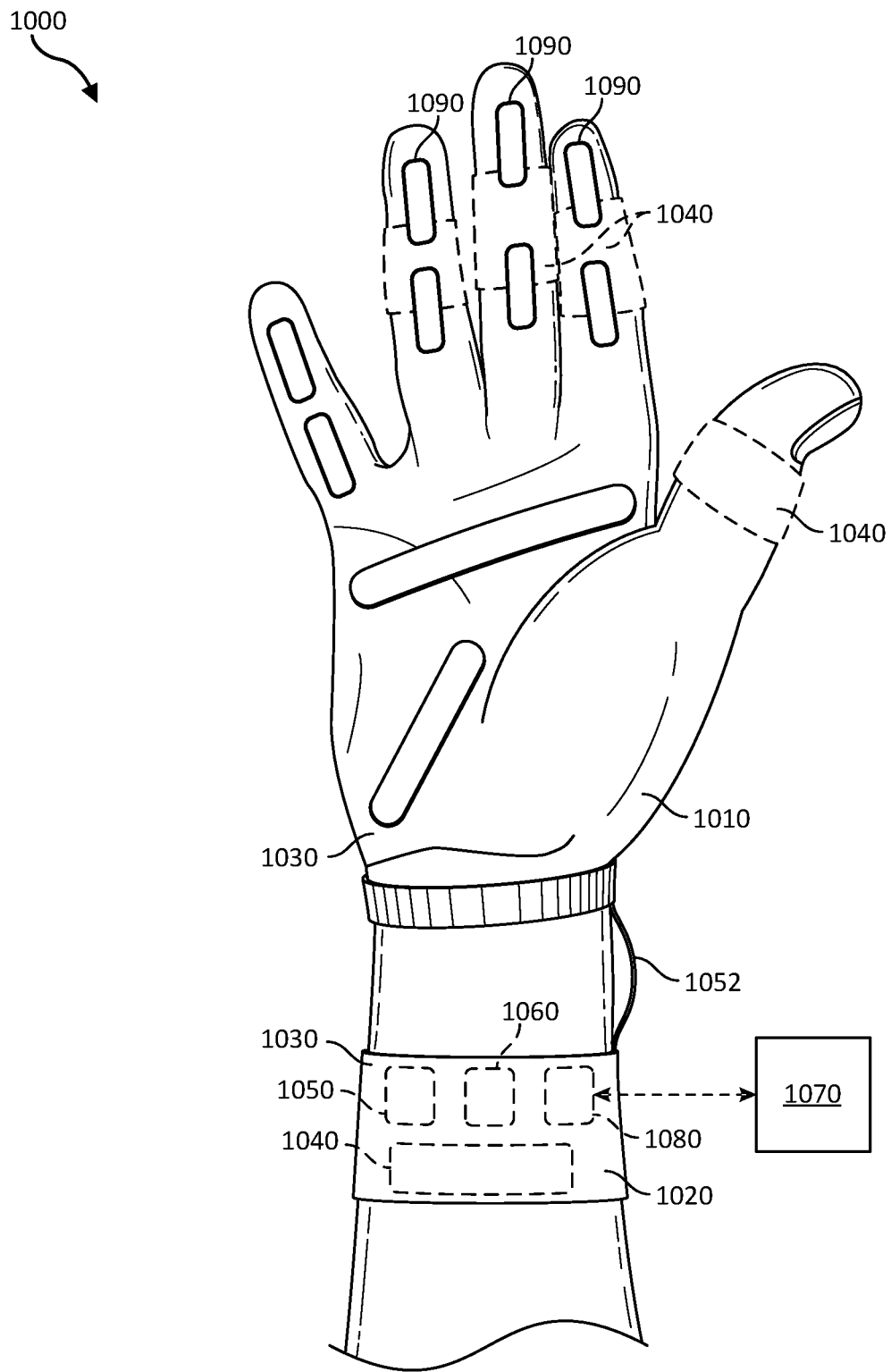
FIG. 10 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 10 illustrates a vibrotactile system 1000 in the form of a wearable glove (haptic device 1010) and wristband (haptic device 1020). Haptic device 1010 and haptic device 1020 are shown as examples of wearable devices that include a flexible, wearable textile material 1030 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1040 may be positioned at least partially within one or more corresponding pockets formed in textile material 1030 of vibrotactile system 1000. Vibrotactile devices 1040 may be positioned in locations to provide a vibrating sensation (e.g., haptic feedback) to a user of vibrotactile system 1000. For example, vibrotactile devices 1040 may be positioned against the user's finger(s), thumb, or wrist, as shown in FIG. 10. Vibrotactile devices 1040 may, in some examples, be sufficiently flexible to conform to or bend with the user's corresponding body part(s).

A power source 1050 (e.g., a battery) for applying a voltage to the vibrotactile devices 1040 for activation thereof may be electrically coupled to vibrotactile devices 1040, such as via conductive wiring 1052. In some examples, each of vibrotactile devices 1040 may be independently electrically coupled to power source 1050 for individual activation. In some embodiments, a processor 1060 may be operatively coupled to power source 1050 and configured (e.g., programmed) to control activation of vibrotactile devices 1040.

Vibrotactile system 1000 may be implemented in a variety of ways. In some examples, vibrotactile system 1000 may be a standalone system with integral subsystems and components for operation independent of other devices and systems. As another example, vibrotactile system 1000 may be configured for interaction with another device or system 1070.

For example, vibrotactile system 1000 may, in some examples, include a communications interface 1080 for receiving and/or sending signals to the other device or system 1070. The other device or system 1070 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1080 may enable communications between vibrotactile system 1000 and the other device or system 1070 via a wireless (e.g., Wi-Fi, Bluetooth, cellular, radio, etc.) link or a wired link. If present, communications interface 1080 may be in communication with processor 1060, such as to provide a signal to processor 1060 to activate or deactivate one or more of the vibrotactile devices 1040.

Vibrotactile system 1000 may optionally include other subsystems and components, such as touch-sensitive pads 1090, pressure sensors, motion sensors, position sensors, lighting elements, and/or user interface elements (e.g., an on/off button, a vibration control element, etc.). During use, vibrotactile devices 1040 may be configured to be activated for a variety of different reasons, such as in response to the user's interaction with user interface elements, a signal from the motion or position sensors, a signal from the touch-sensitive pads 1090, a signal from the pressure sensors, a signal from the other device or system 1070, etc.

Although power source 1050, processor 1060, and communications interface 1080 are illustrated in FIG. 10 as being positioned in haptic device 1020, the present disclosure is not so limited. For example, one or more of power source 1050, processor 1060, or communications interface 1080 may be positioned within haptic device 1010 or within another wearable textile.

Figure 11:
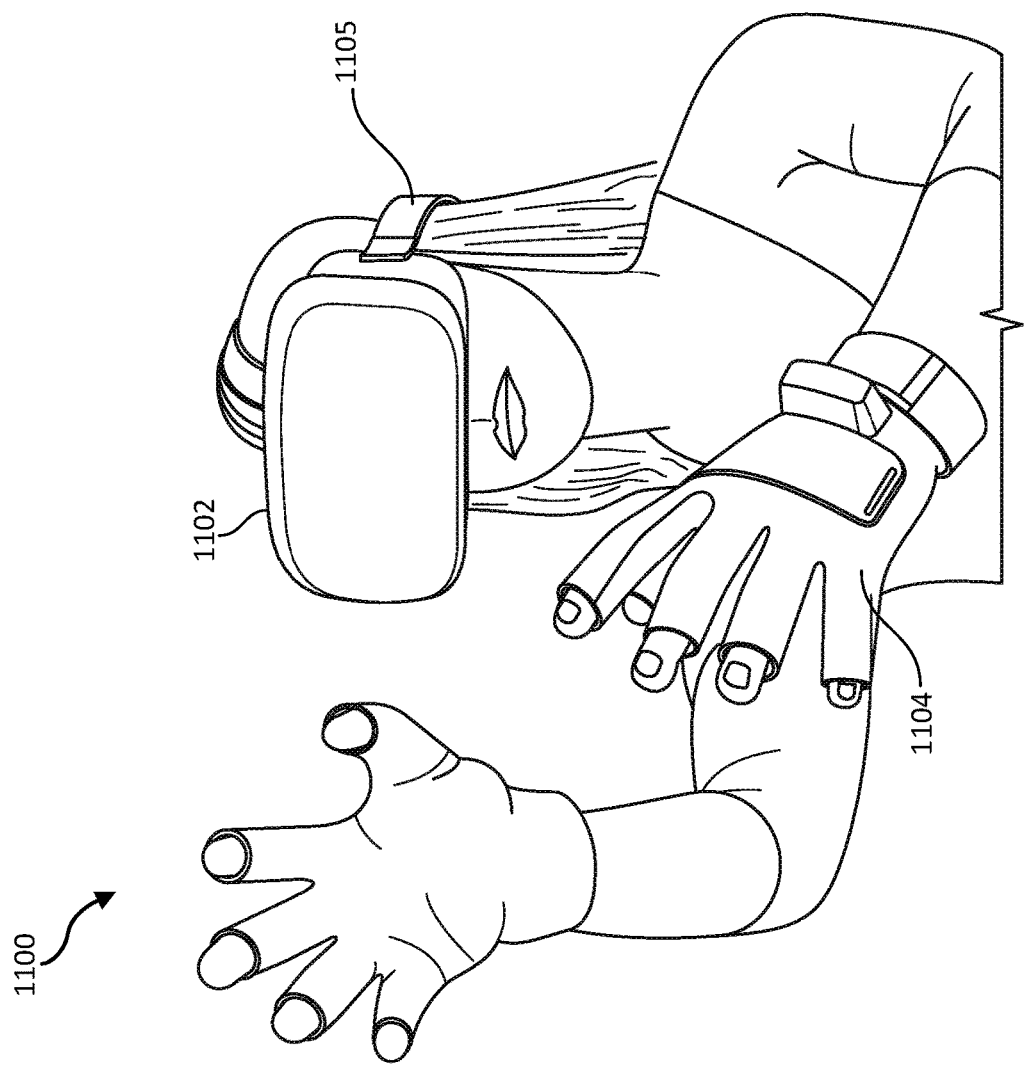
FIG. 11 is an illustration of an exemplary virtual-reality environment according to embodiments of this disclosure.

Haptic wearables, such as those shown in and described in connection with FIG. 10, may be implemented in a variety of types of artificial-reality systems and environments. FIG. 11 shows an example artificial-reality environment 1100 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 9:
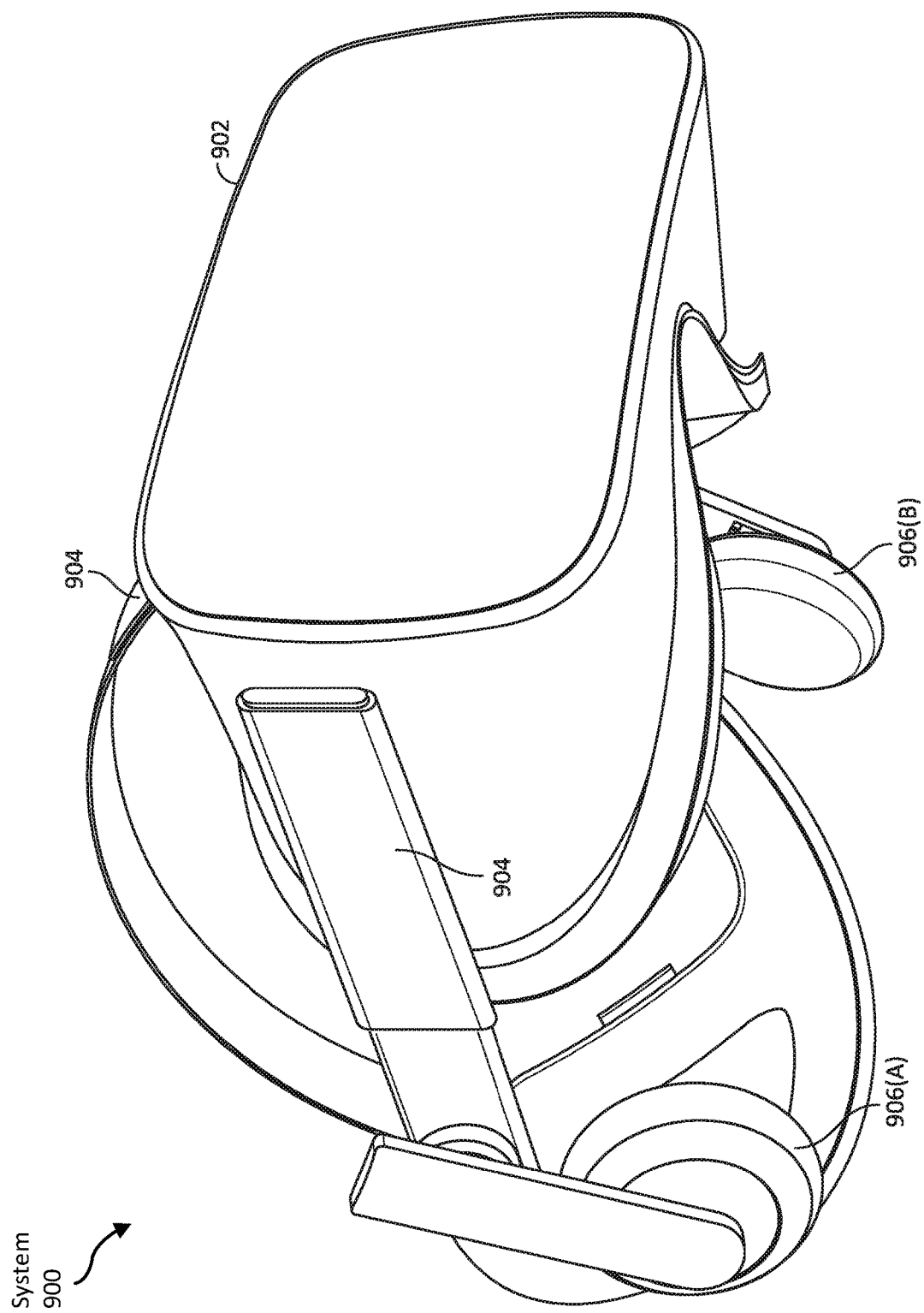
FIG. 9 is an illustration of an exemplary virtual-reality headset that may be used in connection with embodiments of this disclosure.

Head-mounted display 1102 generally represents any type or form of virtual-reality system, such as virtual-reality system 900 in FIG. 9. Head-mounted display 1102 may include an adjustable strap system 1105 (e.g., adjustable strap system 100, 200, 400, or 600 described above) shaped to fit around a user's head. Haptic device 1104 generally represents any type or form of wearable device, worn by a user of an artificial-reality system, that provides haptic feedback to the user to give the user the perception that he or she is physically engaging with a virtual object. In some embodiments, haptic device 1104 may provide haptic feedback by applying vibration, motion, and/or force to the user. For example, haptic device 1104 may limit or augment a user's movement. To give a specific example, haptic device 1104 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1104 to send action requests to a console. Examples of action requests include, without limitation, requests to start an application and/or end the application and/or requests to perform a particular action within the application.

Figure 12:
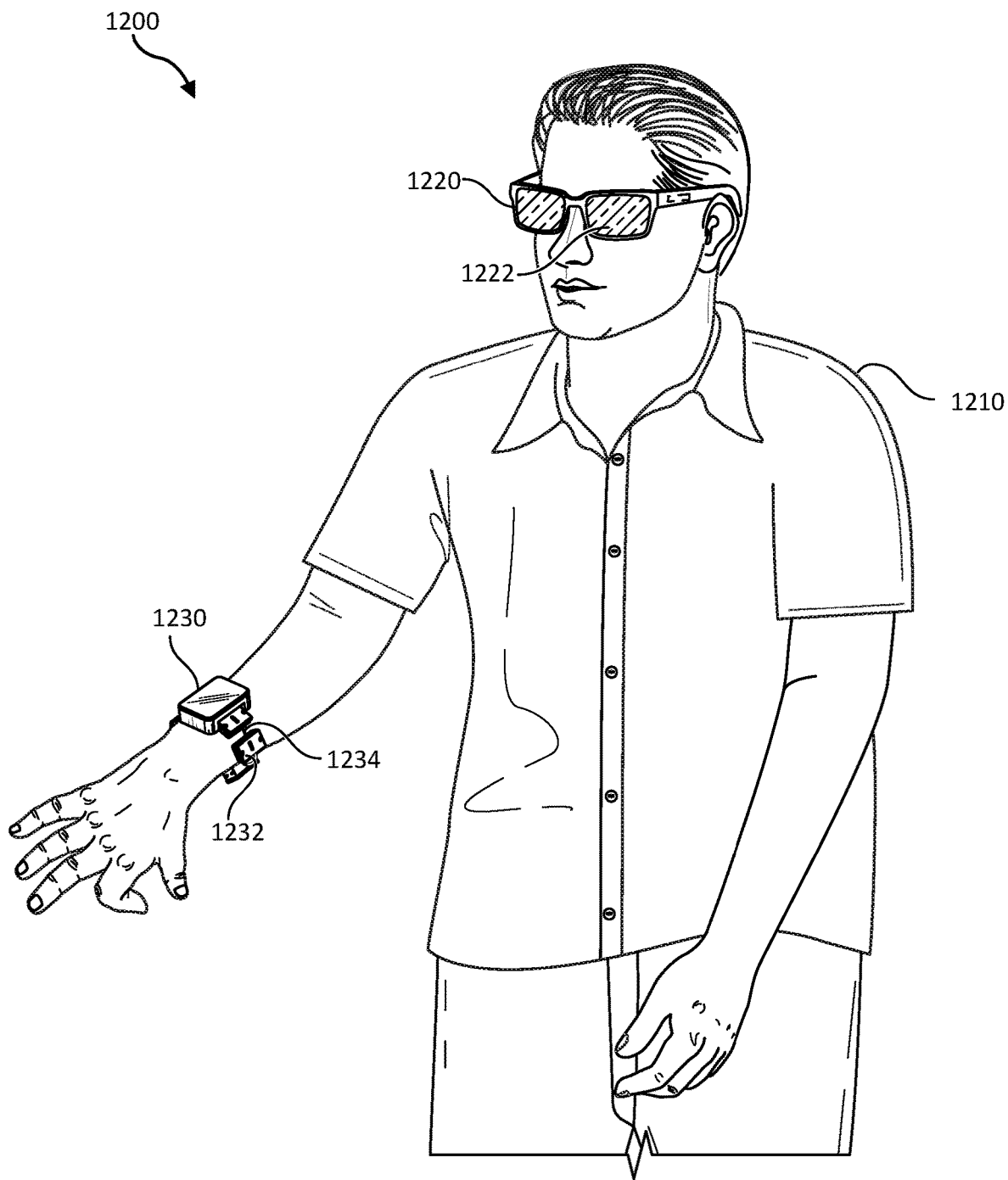
FIG. 12 is an illustration of an exemplary augmented-reality environment according to embodiments of this disclosure.

While haptic interfaces may be used with virtual-reality systems, as shown in FIG. 11, haptic interfaces may also be used with augmented-reality systems, as shown in FIG. 12. FIG. 12 is a perspective view of a user 1210 interacting with an augmented-reality system 1200. In this example, user 1210 may wear a pair of augmented-reality glasses 1220 that may have one or more displays 1222 and that are paired with a haptic device 1230. In this example, haptic device 1230 may be a wristband that includes a plurality of band elements 1232 and a tensioning mechanism 1234 that connects band elements 1232 to one another.

One or more of band elements 1232 may include any type or form of actuator suitable for providing haptic feedback. For example, one or more of band elements 1232 may be configured to provide one or more of various types of cutaneous feedback, including vibration, force, traction, texture, and/or temperature. To provide such feedback, band elements 1232 may include one or more of various types of actuators. In one example, each of band elements 1232 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1010, 1020, 1104, and 1230 may include any suitable number and/or type of haptic transducer, sensor, and/or feedback mechanism. For example, haptic devices 1010, 1020, 1104, and 1230 may include one or more mechanical transducers, piezoelectric transducers, and/or fluidic transducers. Haptic devices 1010, 1020, 1104, and 1230 may also include various combinations of different types and forms of transducers that work together or independently to enhance a user's artificial-reality experience. In one example, each of band elements 1232 of haptic device 1230 may include a vibrotactor (e.g., a vibrotactile actuator) configured to vibrate in unison or independently to provide one or more of various types of haptic sensations to a user.

By way of non-limiting examples, the following embodiments are included in the present disclosure.

Example 1: A strap adjustment device comprising a pinion gear secured to an adjustment knob, a first rack secured to a first strap and engaged with the pinion gear, a second rack secured to a second strap and engaged with the pinion gear, at least one braking element disposed adjacent to an inner surface of a drum, a brake engagement element configured to press the at least one braking element toward the inner surface of the drum to maintain a length of the first strap and the second strap by engagement of the at least one braking element against the inner surface of the drum, and at least one spiral spring coupled to the pinion gear and the brake engagement element to allow for an increase in a length of the first strap and the second strap upon application of a tension force.

Example 2: The strap adjustment device of Example 1, wherein the inner surface of the drum comprises a ratchet and the at least one braking element includes a pawl that is configured to engage the ratchet to maintain the length of the first strap and the second strap.

Example 3: The strap adjustment device of Example 1 or Example 2, wherein the brake engagement element includes a cam that is configured to apply a normal force to the at least one braking element.

Example 4: The strap adjustment device of any of Examples 1 through 3, wherein the at least one braking element includes a brake pad that is configured to abut against the inner surface of the drum to maintain the length of the first strap and the second strap by static friction.

Example 5: The strap adjustment device of any of Examples 1 through 4, wherein a first side of the pinion gear is configured to engage gear teeth of the first rack, a second, opposite side of the pinion gear is configured to engage gear teeth of the second rack, and rotating the adjustment knob causes the first rack to move in a first direction and the second rack to move in a second, opposite direction.

Example 6: The strap adjustment device of any of Examples 1 through 5, further comprising an adjustment plate that is positioned and configured to transfer torque from the at least one spiral spring to the brake engagement element.

Example 7: The strap adjustment device of any of Examples 1 through 6, wherein the length of the first strap and the length of the second strap is maintained based on a position of the adjustment knob.

Example 8: The strap adjustment device of any of Examples 1 through 7, wherein a tension is applied to the at least one spiral spring when a tension is applied to at least one of the first strap or the second strap.

Example 9: The strap adjustment device of any of Examples 1 through 8, further comprising at least one compression spring that is configured to return the adjustment knob to a resting position after rotation of the adjustment knob.

Example 10: The strap adjustment device of any of Examples 1 through 9, wherein the brake engagement element includes a cam that is configured to release the at least one braking element from the inner surface of the drum when the adjustment knob is rotated in a disengaging direction.

Example 11: The strap adjustment device of any of Examples 1 through 10, wherein the brake engagement element includes a cam, the at least one braking element includes a bearing, the bearing is configured to travel within a slot in the cam, and the at least one braking element includes a brake pad that is configured to abut against the inner surface of the drum to maintain the length of the first strap and the second strap based on a position of the bearing within the slot in the cam.

Example 12: An adjustable strap system for a head-mounted display (HMD), comprising a strap adjustment device that is configured to be disposed on a posterior region of a user's head when the HMD is worn by the user, a first strap configured to extend from a first side of the HMD to a first side of the strap adjustment device, and a second strap configured to extend from a second, opposite side of the HMD to a second, opposite side of the strap adjustment device, wherein the strap adjustment device comprises an adjustment knob configured to adjust a length of at least one of the first strap or the second, and a biasing element that is configured to allow for an increase in the length of at least one of the first strap or the second strap when a tension force is applied to at least one of the first strap or the second strap.

Example 13: The adjustable strap system of Example 12, wherein the strap adjustment device comprises a pinion gear secured to the adjustment knob, a first rack secured to the first strap and engaged with the pinion gear, a second rack secured to the second strap and engaged with the pinion gear, at least one braking element disposed adjacent to an inner surface of a drum, and a brake engagement element configured to press the at least one braking element toward the inner surface of the drum to maintain a length of the first strap and the second strap by engagement of the at least one braking element against the inner surface of the drum, wherein the biasing element comprises at least one spiral spring coupled to and between the pinion gear and the brake engagement element to allow for the increase in the length of at least one of the first strap or the second strap when the tension force is applied to at least one of the first strap or the second strap.

Example 14: The adjustable strap system of Example 13, wherein the inner surface of the drum comprises a ratchet and the at least one braking element includes a pawl that is configured to engage the ratchet to maintain the length of the first strap and the second strap.

Example 15: The adjustable strap system of Example 13 or 14, wherein the brake engagement element includes a cam that is configured to apply a normal force to the at least one braking element.

Example 16: The adjustable strap system of any of Examples 13 through 15, wherein the at least one braking element includes a brake pad that is configured to abut against the inner surface of the drum to maintain the length of the first strap and the second strap by static friction.

Example 17: The adjustable strap system of any of Examples 13 through 16, wherein a first side of the pinion gear is configured to engage gear teeth of the first rack, and a second, opposite side of the pinion gear is configured to engage gear teeth of the second rack such that rotating the adjustment knob causes the first rack to move in a first direction and the second rack to move in a second, opposite direction.

Example 18: The adjustable strap system of any of Examples 13 through 17, further comprising an adjustment plate that is positioned and configured to transfer torque from the at least one spiral spring to the brake engagement element.

Example 19: The adjustable strap system of any of Examples 12 through 18, wherein the length of the first strap and the length of the second strap is configured to be maintained based on a position of the adjustment knob.

Example 20: A method of manufacturing a strap adjustment device comprising engaging a first rack extending from a first strap with a pinion gear, engaging a second rack extending from a second strap with the pinion gear, disposing at least one braking element adjacent to an inner surface of a drum, positioning a brake engagement element to press the at least one braking element toward the inner surface of the drum to maintain a length setting of the first strap and the second strap, and coupling at least one spiral spring to and between the pinion gear and the brake engagement element to allow for an increase in a length of at least one of the first strap or the second strap when a tension force is applied to at least one of the first strap or the second strap.

Example 21: The method of Example 20, further comprising rotatably coupling an adjustment knob to the drum in a position to abut against and move the brake engagement element when the adjustment knob is rotated.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A strap adjustment device comprising:
 a pinion gear secured to an adjustment knob;
 a first rack secured to a first strap and engaged with the pinion gear;
 a second rack secured to a second strap and engaged with the pinion gear;
 at least one braking element disposed adjacent to an inner surface of a drum;
 a brake engagement element configured to press the at least one braking element toward the inner surface of the drum to maintain a length of the first strap and the second strap by engagement of the at least one braking element against the inner surface of the drum; and
 at least one spiral spring having a first end coupled to the pinion gear and a second end coupled to the brake engagement element to couple the pinion gear to the brake engagement element, wherein the at least one spiral spring provides a rotational spring force, such that the at least one spiral spring allows the first strap and the second strap to be let out by winding of the at least one spiral spring without disengagement of the brake engagement element from the inner surface of the drum upon application of a tension force in the first strap and the second strap by a user.

2. The strap adjustment device of claim 1, wherein:
 the inner surface of the drum comprises a ratchet; and
 the at least one braking element includes a pawl that is configured to engage the ratchet to maintain the length of the first strap and the second strap.

3. The strap adjustment device of claim 1, wherein the brake engagement element includes a cam that is configured to apply a normal force to the at least one braking element.

4. The strap adjustment device of claim 1, wherein the at least one braking element includes a brake pad that is configured to abut against the inner surface of the drum to maintain the length of the first strap and the second strap by static friction.

5. The strap adjustment device of claim 1, wherein:
 a first side of the pinion gear is configured to engage gear teeth of the first rack;

a second, opposite side of the pinion gear is configured to engage gear teeth of the second rack; and rotating the adjustment knob causes the first rack to move in a first direction and the second rack to move in a second, opposite direction.

6. The strap adjustment device of claim 1, further comprising an adjustment plate that is positioned and configured to transfer torque from the at least one spiral spring to the brake engagement element.

7. The strap adjustment device of claim 1, wherein the length of the first strap and the length of the second strap is maintained based on a position of the adjustment knob.

8. The strap adjustment device of claim 1, wherein a tension is applied to the at least one spiral spring when a tension is applied to at least one of the first strap or the second strap.

9. The strap adjustment device of claim 1, further comprising at least one compression spring that is configured to return the adjustment knob to a resting position after rotation of the adjustment knob.

10. The strap adjustment device of claim 1, wherein the brake engagement element includes a cam that is configured to release the at least one braking element from the inner surface of the drum when the adjustment knob is rotated in a disengaging direction.

11. The strap adjustment device of claim 1, wherein:
the brake engagement element includes a cam;
the at least one braking element includes a bearing;
the bearing is configured to travel within a slot in the cam; and
the at least one braking element includes a brake pad that is configured to abut against the inner surface of the drum to maintain the length of the first strap and the second strap based on a position of the bearing within the slot in the cam.

12. An adjustable strap system for a head-mounted display (HMD), comprising:
a strap adjustment device that is configured to be disposed on a posterior region of a user's head;
a first strap configured to extend from a first side of the HMD to a first side of the strap adjustment device; and
a second strap configured to extend from a second, opposite side of the HMD to a second, opposite side of the strap adjustment device, wherein the strap adjustment device comprises:
a pinion gear;
a first rack secured to the first strap and engaged with the pinion gear;
a second rack secured to the second strap and engaged with the pinion gear;
at least one braking element disposed adjacent to an inner surface of a drum;
an adjustment knob configured to adjust a length of at least one of the first strap or the second strap by disengaging the at least one braking element from the inner surface of the drum; and
a biasing element that is positioned between the pinion gear and the at least one braking element and that is configured to allow for an increase in the length of at least one of the first strap or the second strap by allowing biased rotation of the pinion gear when a tension force is applied to at least one of the first strap or the second strap by a user without rotating the adjustment knob and without disengagement of the at least one braking element from the inner surface of the drum.

13. The adjustable strap system of claim 12, wherein the strap adjustment device further comprises:
a brake engagement element configured to press the at least one braking element toward the inner surface of the drum to maintain a length of the first strap and the second strap by engagement of the at least one braking element against the inner surface of the drum,
wherein the biasing element comprises at least one spiral spring coupled to and between the pinion gear and the brake engagement element to allow for the increase in the length of at least one of the first strap or the second strap when the tension force is applied to at least one of the first strap or the second strap.

14. The adjustable strap system of claim 13, wherein:
the inner surface of the drum comprises a ratchet; and
the at least one braking element includes a pawl that is configured to engage the ratchet to maintain the length of the first strap and the second strap.

15. The adjustable strap system of claim 13, wherein the brake engagement element includes a cam that is configured to apply a normal force to the at least one braking element.

16. The adjustable strap system of claim 13, wherein the at least one braking element includes a brake pad that is configured to abut against the inner surface of the drum to maintain the length of the first strap and the second strap by static friction.

17. The adjustable strap system of claim 13, wherein:
a first side of the pinion gear is configured to engage gear teeth of the first rack; and
a second, opposite side of the pinion gear is configured to engage gear teeth of the second rack such that rotating the adjustment knob causes the first rack to move in a first direction and the second rack to move in a second, opposite direction.

18. The adjustable strap system of claim 13, further comprising an adjustment plate that is positioned and configured to transfer torque from the at least one spiral spring to the brake engagement element.

19. The adjustable strap system of claim 12, wherein the length of the first strap and the length of the second strap is configured to be maintained based on a position of the adjustment knob.

* * * * *